(12) United States Patent
Nishikado et al.

(10) Patent No.: US 7,127,502 B1
(45) Date of Patent: Oct. 24, 2006

(54) COMMUNICATION PROXY DEVICE

(75) Inventors: Takashi Nishikado, Kawasaki (JP); Kenichi Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/890,826

(22) PCT Filed: Jan. 27, 2000

(86) PCT No.: PCT/JP00/00407

§ 371 (c)(1),
(2), (4) Date: Oct. 5, 2001

(87) PCT Pub. No.: WO00/46679

PCT Pub. Date: Aug. 10, 2000

(30) Foreign Application Priority Data

Feb. 5, 1999 (JP) .................................. 11-028086

(51) Int. Cl.
*G06F 15/16* (2006.01)
(52) U.S. Cl. ....................................... 709/219; 709/227
(58) Field of Classification Search ........ 709/200–203, 709/238, 204–207, 217–219, 227–229; 707/3; 719/313, 314, 311, 330; 712/220–248
See application file for complete search history.

(56) References Cited

U.S. PATENT DOCUMENTS

| | | | | |
|---|---|---|---|---|
| 5,727,159 A | * | 3/1998 | Kikinis ........................ | 709/246 |
| 5,918,013 A | * | 6/1999 | Mighdoll et al. ........... | 709/217 |
| 5,935,207 A | * | 8/1999 | Logue et al. ................ | 709/219 |
| 6,049,821 A | * | 4/2000 | Theriault et al. ........... | 709/203 |
| 6,065,058 A | | 5/2000 | Hailpern et al. | |
| 6,138,162 A | * | 10/2000 | Pistriotto et al. ........... | 709/229 |
| 6,272,531 B1 | * | 8/2001 | Shrader ....................... | 709/206 |
| 6,298,383 B1 | * | 10/2001 | Gutman et al. ............. | 709/229 |
| 6,317,783 B1 | * | 11/2001 | Freishtat et al. ............ | 709/218 |
| 6,330,606 B1 | * | 12/2001 | Logue et al. ................ | 709/226 |
| 6,345,303 B1 | * | 2/2002 | Knauerhase et al. ........ | 709/238 |
| 6,377,993 B1 | * | 4/2002 | Brandt et al. ............... | 709/227 |

(Continued)

FOREIGN PATENT DOCUMENTS

JP            11-007407           1/1999

OTHER PUBLICATIONS

Clinton et al., Proxy-Sharing Proxy Servers, 1996, IEEE, all pages.*

(Continued)

*Primary Examiner*—David Wiley
*Assistant Examiner*—Joseph E. Avellino
(74) *Attorney, Agent, or Firm*—Mattingly, Stanger, Malur & Brundidge, P.C.

(57) ABSTRACT

An object of the present invention is to provide a communication proxy apparatus that achieves a high-speed access to latest information by making full use of a cache data in response to an access request for the information data without changing a server device or a client device, and that realizes high-speed access control using a simple instruction.

The communication proxy apparatus additionally comprises:
an individual action control means for conditionally instructing execution of an action by explicitly instructing identification information of specific information data, or by adding the information data and an individual action tag to reply data received from another device; and
a distributed access control means for performing the following: keeping an access log for the specific information data using said means; referring to the log; executing the instructed process for the communication proxy, which has accessed the information data; aggregating execution results; and returning the aggregated result.

3 Claims, 28 Drawing Sheets

U.S. PATENT DOCUMENTS

| | | | |
|---|---|---|---|
| 6,505,241 B1 * | 1/2003 | Pitts | 709/218 |
| 6,535,509 B1 * | 3/2003 | Amicangioli | 370/389 |
| 6,574,661 B1 * | 6/2003 | Delano et al. | 709/223 |
| 6,615,258 B1 * | 9/2003 | Barry et al. | 709/223 |
| 6,631,402 B1 * | 10/2003 | Devine et al. | 709/217 |
| 6,643,778 B1 * | 11/2003 | Nakazawa | 713/201 |
| 6,708,171 B1 * | 3/2004 | Waldo et al. | 707/10 |
| 2001/0052013 A1 * | 12/2001 | Munguia et al. | 709/225 |
| 2002/0071422 A1 * | 6/2002 | Amicangioli | 370/351 |

OTHER PUBLICATIONS

Pel Cao et al., "Active Cache: Caching Dynamic Contents on the Web", Proc. Of Middleware 98', Britain, Sep. 15, 1998, p. 373-388.

Yanagihara et al., "A research for proxy server with message rewriting function", Report of Kyoto Industrial University Computer Science Laboratory, Japan, 1998, vol. 14, No. 2, p. 85-106.

* cited by examiner

FIG. 9

| 41 INFORMATION DATA IDENTIFIER | 92 ACTION TYPE CLASSIFICATION INFORMATION | 93 | | | 97 |
|---|---|---|---|---|---|
| | | 94 ACTION IDENTIFICATION INFORMATION | 95 ACTION CONDITION | 96 ACTION INFORMATION ACTION PARAMETER | ACTION VALIDITY TERM |
| //SERVER1a/fa1 | EXPLICIT INSTRUCTION | ACCESS LOGGING | ON REPLY DATA TRANSMISSION | — | 99/1/1 10:00:00 |
| //SERVER1b/fb1 | TAG INSTRUCTION | ACCESS CHECK | ON CACHE HIT | GROUP A | 98/12/10 12:00:00 |
| ... | ... | ... | ... | ... | ... |

71, 90

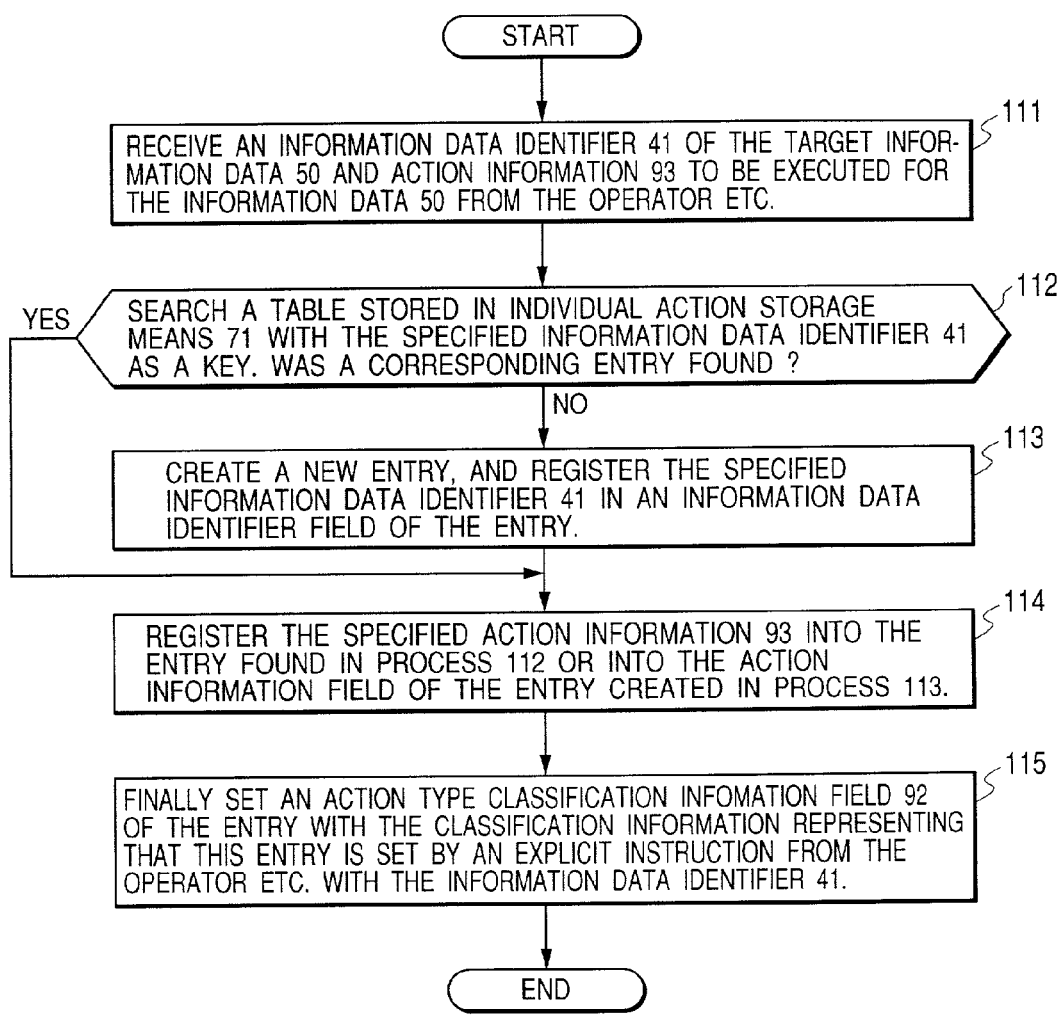

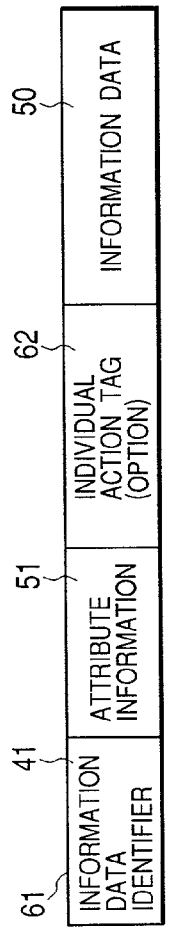
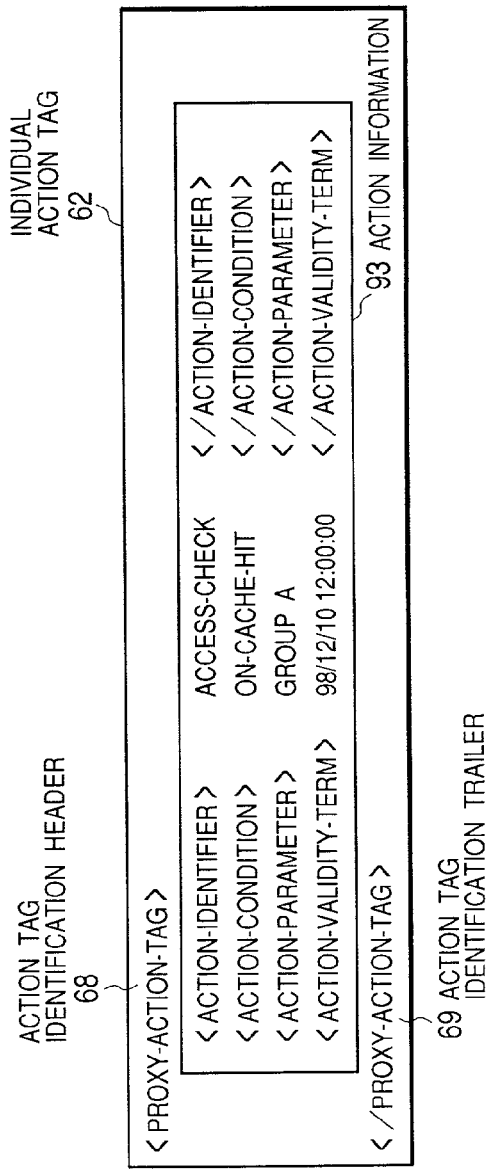

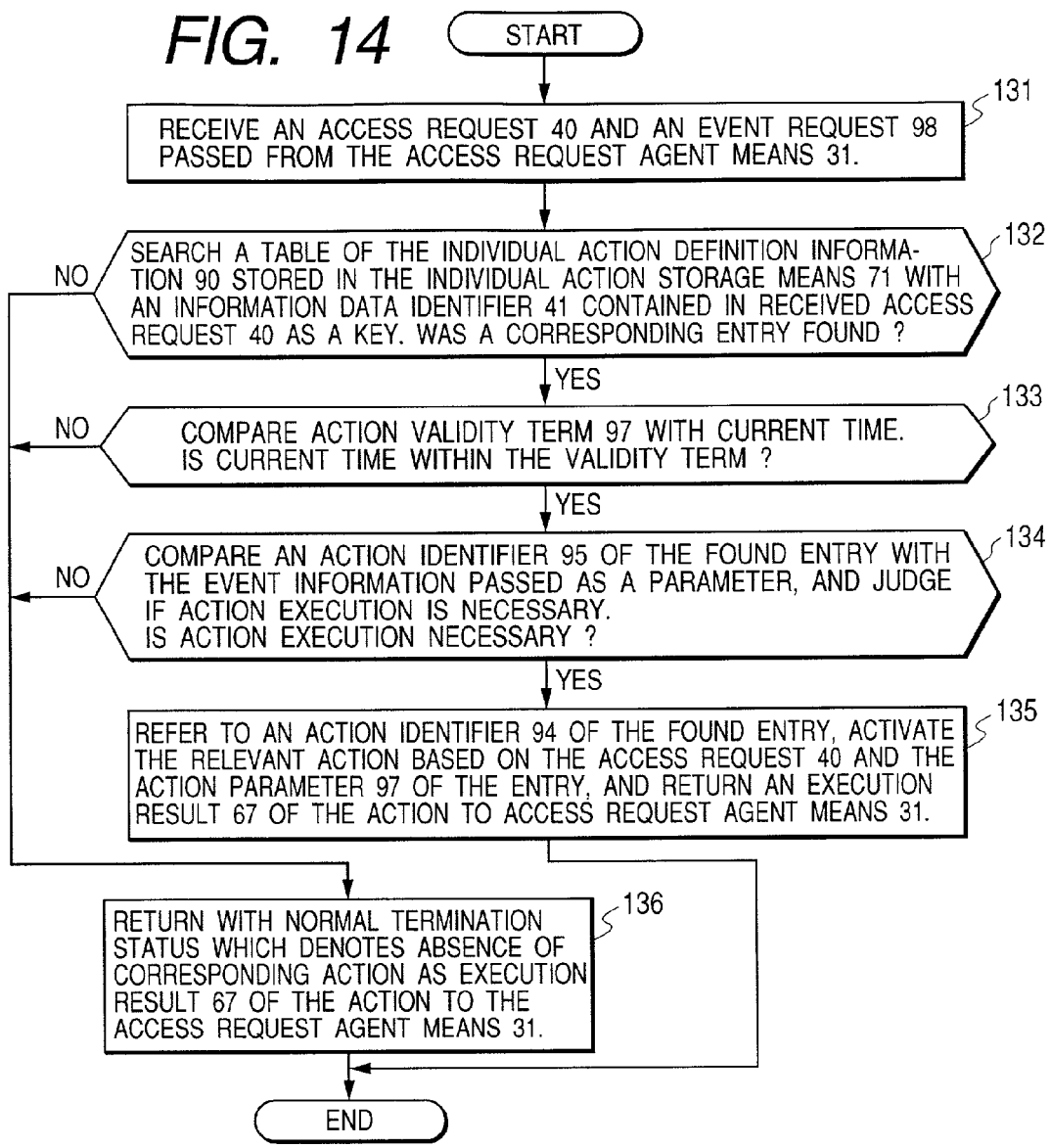
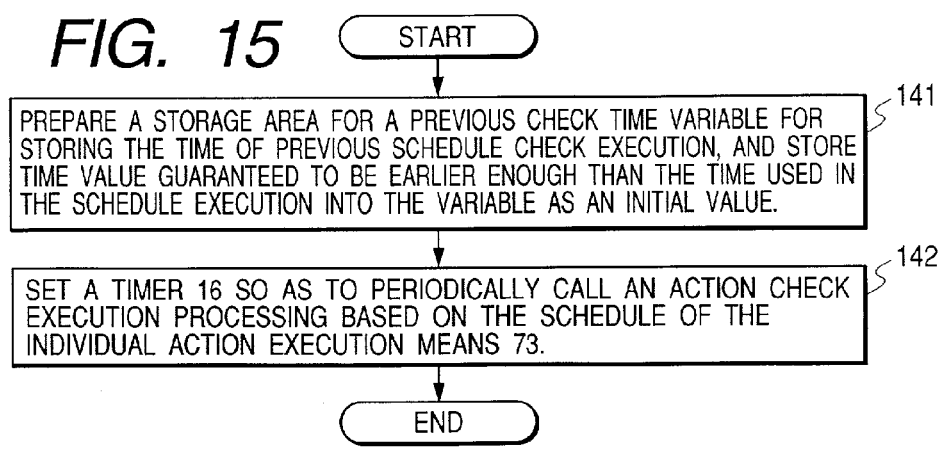

FIG. 18

| INFORMATION DATA IDENTIFIER (85) | ORIGINAL ACCESS REQUEST ISSUER INFORMATION (41) | ACCESSOR INFORMATION (42) | CLIENT/PROXY CLASSIFICATION (43) | ACCESS TIME INFORMATION (44, 86) |
|---|---|---|---|---|
| //SERVER1a/fa1 | USER A | PROXY 3a | PROXY | 98/01/02 15:10:11 |
| //SERVER1a/fa1 | USER C | PROXY 3d | PROXY | 98/01/03 14:30:10 |
| //SERVER1b/fb1 | USER D | PROXY 3d | PROXY | 98/01/03 16:50:22 |
| //SERVER1b/fb1 | USER A | PROXY 3a | PROXY | 98/01/05 20:05:52 |
| ⋮ | ⋮ | ⋮ | ⋮ | ⋮ |

FIG. 20

63 — 631 PROGRAM

```
class GetAccessInfo {    // PROCESSING PROGRAM WRITTEN IN JAVA ETC.
    public static void main(String args[]) {
        ......
    }
}
```

FIG. 21

| ACCESS LOGGING SUMMARIZATION PROCESSING | — |
|---|---|

63

632 PROCESSING PROGRAM IDENTIFIER      633 PARAMETER

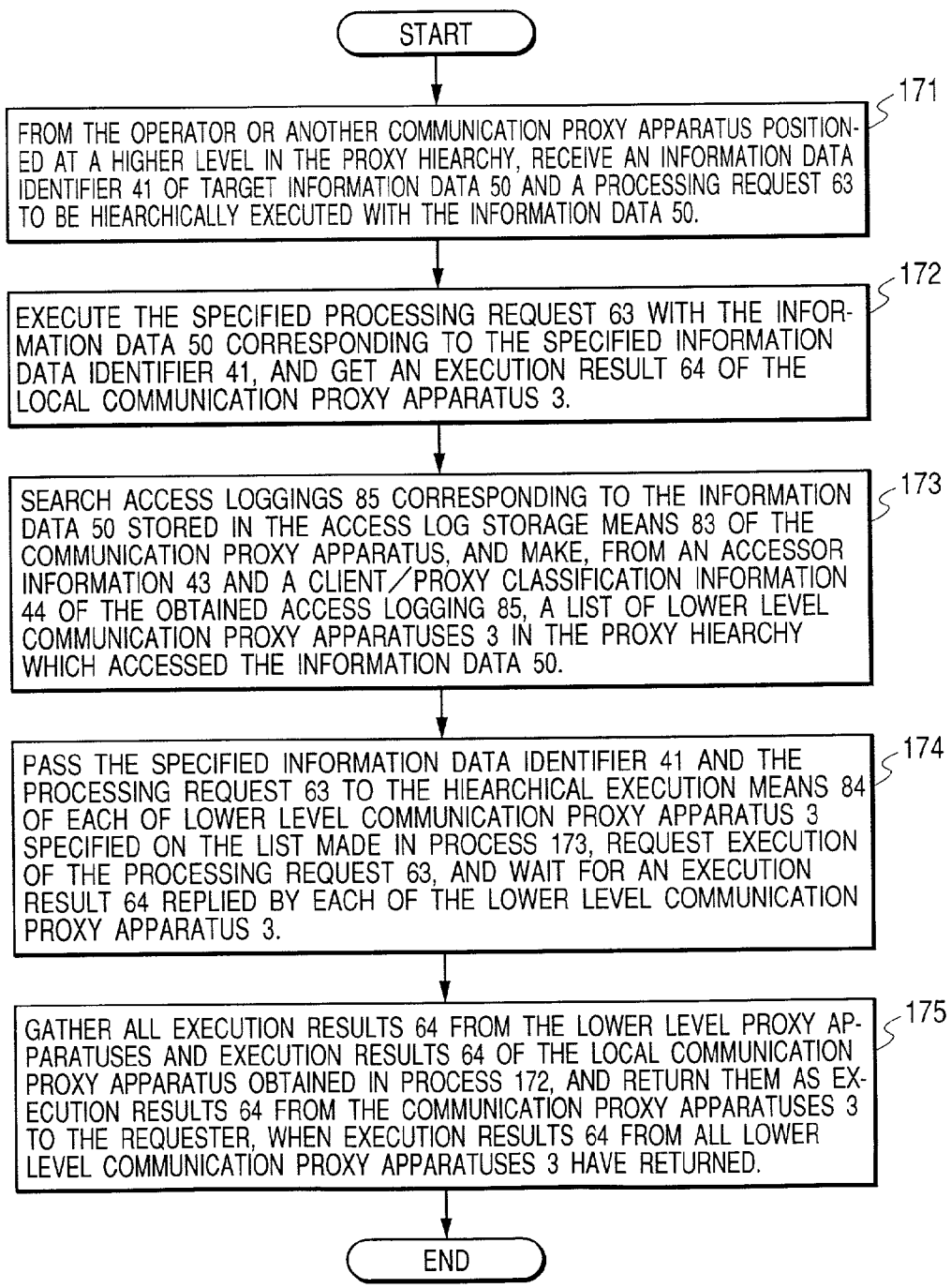

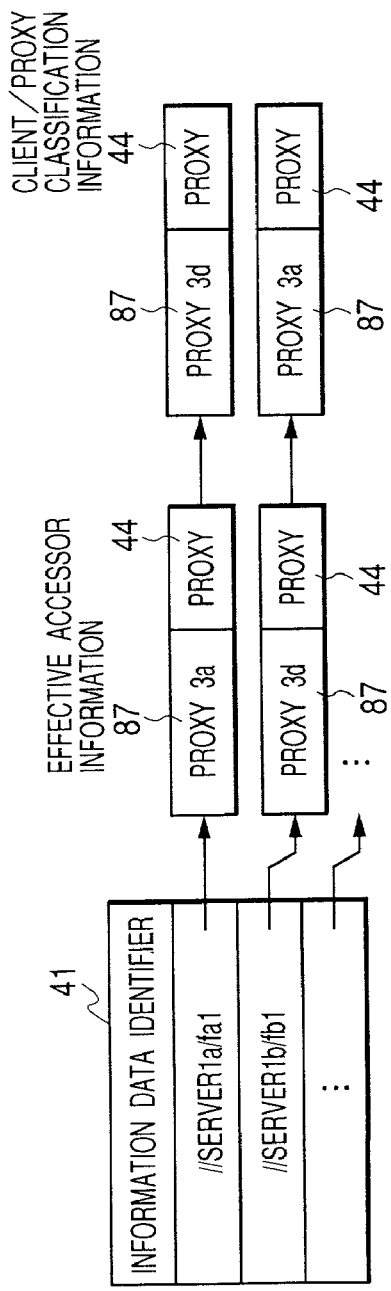

FIG. 29
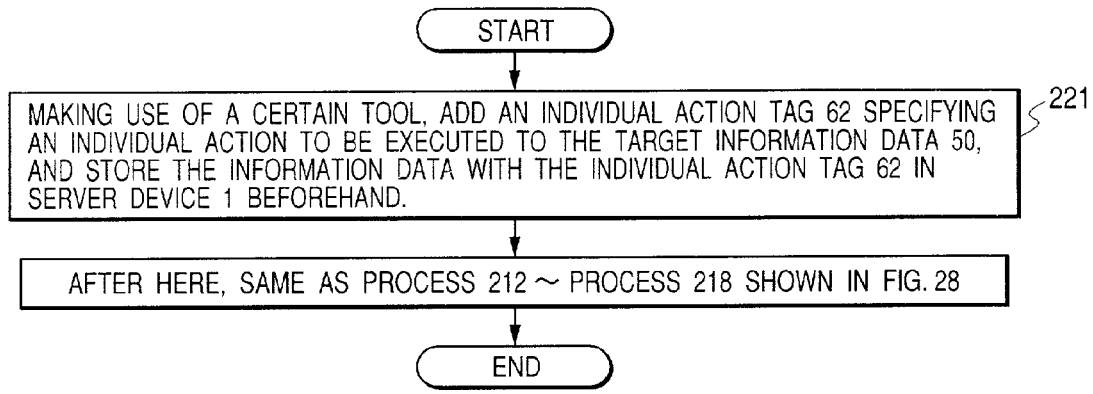
FIG. 30
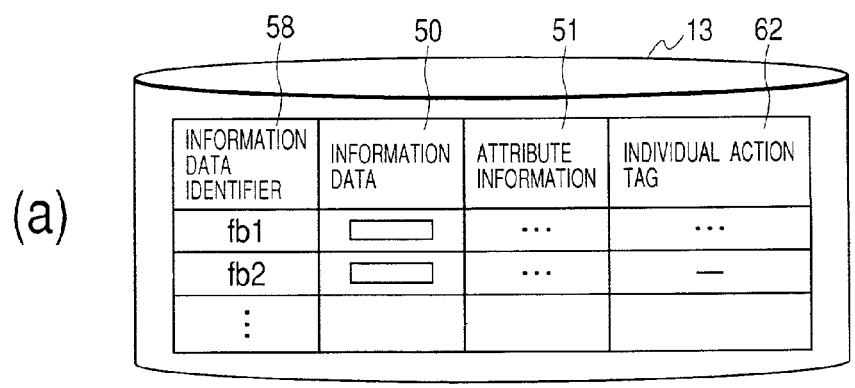
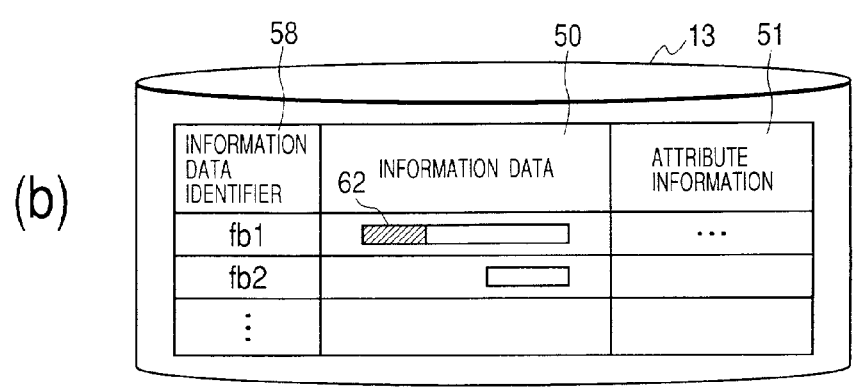

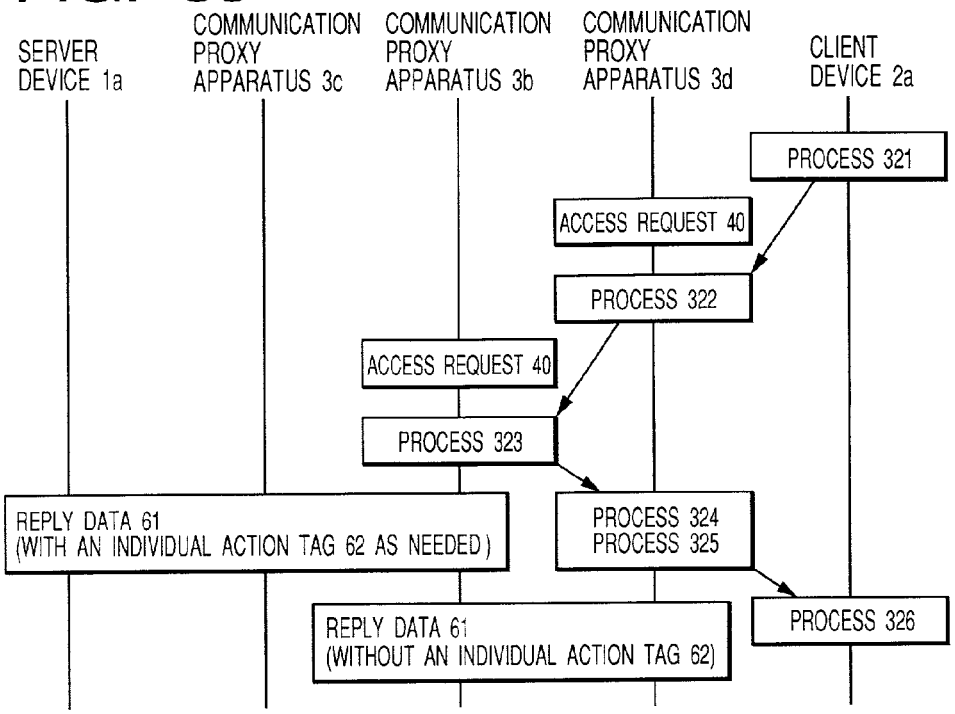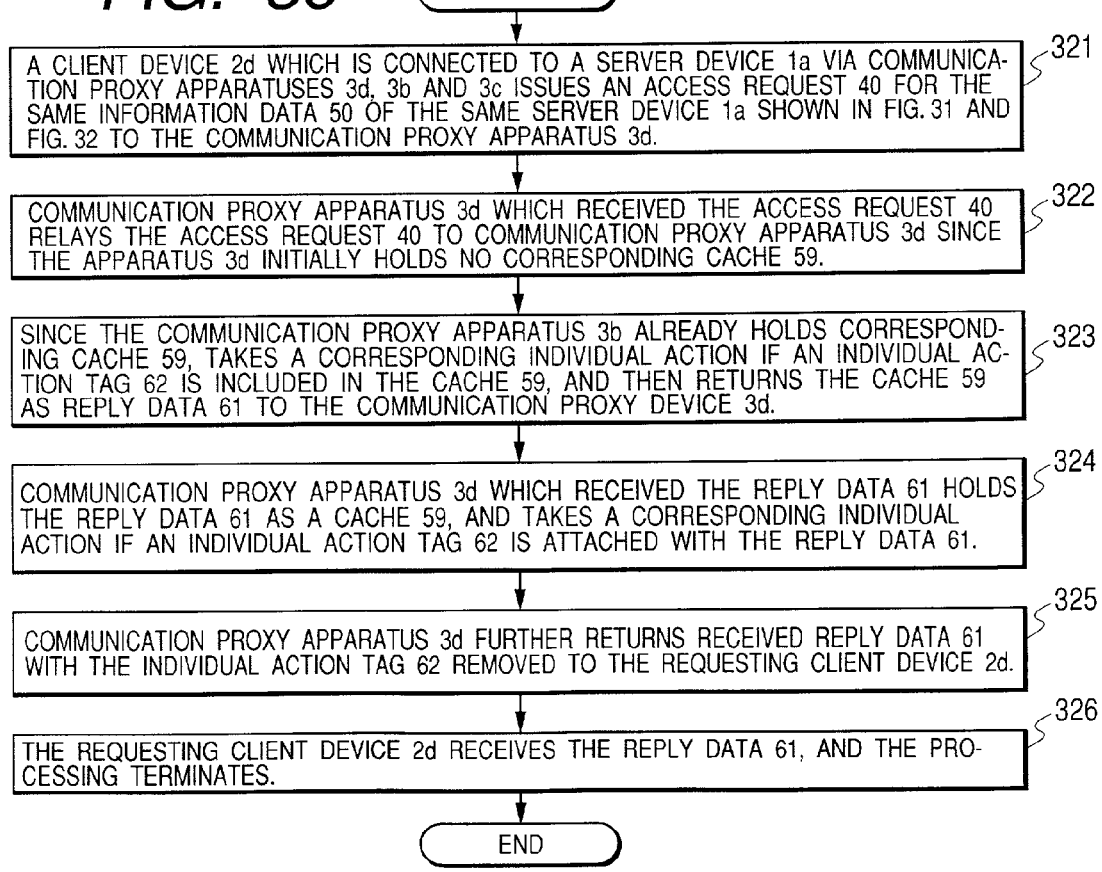

| ACTION IDENTIFIER 94 | ENTRY ADDRESS 78 |
|---|---|
| ACCESS LOGGING | 10000 |
| ACCESS CHECK | 13000 |
| ACTION X | 20000 |
| ACTION Z | 25000 |
| ⋮ | ⋮ |

COMMUNICATION PROXY DEVICE

BACKGROUND OF THE INVENTION

The present invention relates to a communication proxy apparatus, which relays communication between a server device and a client device as an agent in a network system including WWW (World Wide Web) used for accessing information data on the server device from the client device connected through a communication line, and also relates to a system that uses said communication proxy apparatus.

A conventional communication proxy technology is described in RFC2068 "Hypertext Transfer Protocol—HTTP/1.1" (pages from 11 to 13) issued on January 1997. According to this prior art, a communication proxy apparatus for relaying communication as an agent is provided between a WWW server device and a client device to speed up an access to World Wide Web data, which is information data on the server device, from the client device.

In the prior art, speed-up of an access from the client device is achieved by the following: the communication proxy apparatus for relaying communication between both devices as an agent is provided between the server device and the client device; and the communication proxy apparatus maintains and manages relayed information data as a cache. More specifically, the congestion of accesses from the plurality of client devices to the server device are prevented, and speed-up of an access from each client device is achieved, by the following steps: holding information data, which has been relayed by the communication proxy apparatus as an agent, as a cache; and for an access request from the client device for an access to information data, of which a latest version has already been held as a cache, not relaying the access request as an agent, but returning the cache.

In addition, a technology for efficiently accessing information data on a server device, which is periodically updated, from a client device is described in "An introduction to XML" issued by Nihon Keizai Shimbun, Inc. in 1998 (pages from 36 to 47).

In this prior art, cache expiration time information is added to information data, which is distributed from the server device, as attribute information of the information data, before transmitting the information data to client devices. Client devices can acquire the latest information data by reacquiring the latest information data repeatedly according to the cache expiration time information.

SUMMARY OF THE INVENTION

The above-mentioned prior art, which utilizes the conventional communication proxy apparatus, has an advantage that it is possible to prevent the congestion of accesses to the server device, and to speed up the access to the server device, by utilizing a cache of the communication proxy apparatus successfully.

However, on the other hand, there is the following problem: only part of the access requests is transferred to the server device because an access request is handled by each communication proxy apparatus using the cache; therefore, it is not possible to collect all access information, each of which contains the information concerning accessed information data and client devices that have issued the access request for the accessed information data.

In addition, there is another problem: when checking access authority, even if the cache data is available, the access request must always be transferred to the server device to request the server device to perform the check.

Moreover, the following problem also arises: the above-mentioned prior art that client devices request the latest information data periodically through the cache cannot work well in the case of information data for which an update frequency cannot be expected beforehand. One of ways to utilize the cache of each communication proxy apparatus for the information data of which update frequency cannot be expected is to forcibly set a certain cache expiration time information. However, that causes the cache held in each communication proxy apparatus inconsistent with the information data on the server device side. As a result, client devices may refer to old information data for a relatively long time. Therefore, in order to keep the cache of all communication proxy apparatuses consistent with the information data on the server device with short time delay, it is necessary to update all corresponding caches held in each communication proxy apparatus every time the information data on the server device is updated.

In some conventional systems, a means to update the cache held in communication proxy apparatuses and client devices is provided by specifying each target communication proxy apparatus and client device to be updated. However, there is the following problem in this solution: it is necessary to transmit data to all relevant communication proxy apparatuses by specifying serially one by one taking a configuration of the communication proxy apparatuses into consideration; and there is a possibility of unnecessarily transmitting the latest information data even to a communication proxy apparatus that does not hold a corresponding cache.

For the purpose of coping with the problems relating to the collection of access information, and the cache update, some conventional communication proxy apparatuses use another method by which the problems are solved using an access log for each information data. To be more specific, access information on accesses to specific information data is collected by referring to the access log held in each communication proxy apparatus, and by extracting accesses to the specific information data. In addition, the cache is updated by using the collected access information, and by transmitting the latest information data only to communication proxy apparatuses that have actually accessed the information data.

However, in this solution, there was no means for limiting target information data to be logged in an access log. Because of it, there were the following problems: each communication proxy apparatus was required to hold an access log containing an enormous amount of data; in addition, even if there was the means for limiting target information data to be logged in an access log, individual settings were required for each communication proxy apparatus, and it was difficult to make the settings. Moreover, there were also problems relating to the above-mentioned collection processing: the processing became serial because an access log held in each communication proxy apparatus was obtained and processed sequentially one by one; and traffics in the network increased because the same communication channel might be passed through many times when acquiring each access log, which required considerable time for the processing. As regards access authority check, there was also a similar problem, that is to say, individual settings were required for each communication proxy apparatus to avoid a check request that was transferred to the server device.

The above-mentioned problems of the prior art can be solved by additionally providing a communication proxy apparatus with the following two means.

In the first place, each communication proxy apparatus is provided with an individual action control means. The individual action control means is a means for instructing each communication proxy apparatus to perform various kinds of processing, such as keeping an access log on specific information data.

The individual action control means comprises an individual action storage means, an individual action instruction means, an individual action execution means, and an individual action tag adding/removing means.

The individual action storage means holds individual action definition information indicating a relationship between action information and specific information data. The action information indicates an action to be executed for the specific information data, and execution conditions and parameters, which are used for the action.

The individual action instruction means provides a function of registering the above-mentioned individual action definition information in the individual action storage means using the following two methods. One method is as follows: an operator, or the like, gives explicit instruction, which includes identification information of target information data and action information to be executed for the information data, to the individual action instruction means so that the instructed information is registered in the individual action storage means. Another method is as follows: an individual action tag for instructing action information to be executed for the information data is added to the reply data, and reply data received by the communication proxy apparatus is checked by the individual action instruction means; if it is found out that an individual action tag for instructing action information to be executed for the information data is added to the reply data, individual action definition information for the information data is registered according to the action information.

The individual action execution means executes the instructed individual action for the information data, which is instructed by the individual action definition information, under instructed conditions.

The individual action tag adding/removing means adds the above-mentioned individual action tag, or removes the added individual action tag, under a certain condition, when transmitting from the communication proxy apparatus the information data received by the communication proxy apparatus, and the individual action tag added data received together with the information data. The individual action tag is added, for example, when transmitting information data for which individual action definition information is registered by an explicit instruction of action information. The individual action tag is deleted, for example, when transmitting information data with an individual action tag to the client device. In this connection, judgment whether or not the individual action definition information has been registered by an explicit instruction of action information is made by providing the above-mentioned individual action definition information with an action type classification information, which indicates that the individual action definition information is registered by an explicit instruction of action information or that the individual action definition information is registered by an individual action tag added to the information data. The action type classification information is registered when the above-mentioned individual action instruction means registers the individual action definition information of each information data in the action storage means.

Next, as a means for hierarchical execution of a collection process of access logs and a update process of a cache, and the like, a distributed access control means is provided for each communication proxy apparatus.

The distributed access control means comprises an access logging instruction means, an access logging means, an access log storage means, and a hierarchical execution means.

The access logging instruction means instructs the communication proxy apparatus to keep an access log relating to an access request for the specific information data described above. The access logging instruction means is configured using the above-mentioned individual action control means for example.

The access logging means logs an access record of a device or a user from which an access request is issued, when the communication proxy apparatus handles the access request for the information data for which the access log is instructed by the above-mentioned access logging instruction means.

The access log storage means holds the access log recorded by the access logging means.

The hierarchical execution means performs the following steps: receiving a processing request instruction for specific information data; executing the instructed processing request for the instructed information data; transferring the processing request instruction to communication proxy apparatuses of lower levels, of which the above-mentioned access log storage means keeps an access log for the instructed information data; and after executing the processing request hierarchically, aggregating execution results obtained from the communication proxy apparatuses of lower levels and an execution result of own communication proxy apparatus, and returning the aggregated result.

In addition, for the purpose of checking access authority in each communication proxy apparatus in a distributed manner, the distributed access control means is additionally provided with an access check means.

Using a communication proxy apparatus having the action control means and the distributed access control means described above solves the above-mentioned problems as follows.

As regards the collection of access logs, to begin with, through the individual action instruction means, an operator specifies server-side edge communication proxy apparatus, which is connected to the server device not through another communication proxy apparatus but directly through a communication path, an identification information of target information data for which an access log should be kept, and an action information to make the above-mentioned access logging means executed for the target information data at appropriate timing of the access processing for the information data.

In response to the instruction, in the edge communication proxy apparatus on the server device side, the individual action execution means executes an action according to the instruction, and only when an access request for the information data is issued, the access is logged.

Moreover, in the edge communication proxy apparatus on the server device side, when reply data received from the server device is transmitted to other communication proxy apparatuses, the individual action tag adding/removing means adds an individual action tag, which instructs execution of the above-mentioned access logging means when handling the access request for the information data, to the reply data. Therefore, a communication proxy apparatus, which is located on the client device side as compared with an edge communication proxy apparatus on the server device side, receives information data with the individual action tag. Because of it, in each communication proxy apparatus, likewise, an access log is kept only when an access request for the information data is issued.

Finally, in an edge communication proxy apparatus of the client side, which is connected directly to the client device through the communication path, when reply data received by the communication proxy apparatus is transmitted to the client device, the above-mentioned individual action tag adding/removing means removes the individual action tag, which has been added to the reply data, before the reply data is transmitted.

That is to say, only an instruction given to an edge communication proxy on the server device side enables an access log only for specific information data, to be kept in each communication proxy apparatus without changing the server device or the client device.

BRIEF DESCRIPTION OF THE DRAWINGS

FIG. 4 is a configuration diagram illustrating information that is stored in an external storage unit of a server device according to the present invention;

FIG. 9 is a configuration diagram illustrating individual action definition information that is stored in an individual action storage means according to the present invention;

FIG. 10 is a process flowchart of an individual action instruction means based on an explicit instruction, which uses an information data identifier, according to the present invention;

FIG. 11 is a configuration diagram illustrating reply data information for an access request according to the present invention;

FIG. 12 is a configuration diagram illustrating an individual action tag according to the present invention;

FIG. 14 is a process flowchart of action check processing executed for an event of an individual action execution means according to the present invention;

FIG. 15 is an initialization process flowchart of action check processing that is based on a schedule of an individual action execution means according to the present invention;

FIG. 18 is a configuration diagram illustrating an access log that is stored in an access log storage means according to the present invention;

FIG. 19 is a process flowchart of hierarchical execution processing of a hierarchical execution means according to the present invention;

FIG. 20 is an explanatory diagram illustrating a processing request at the time of requesting a hierarchical execution according to the present invention;

FIG. 21 is another explanatory diagram illustrating a processing request at the time of requesting a hierarchical execution according to the present invention;

FIG. 22 is an explanatory diagram illustrating an execution result of a hierarchical execution processing according to the present invention;

FIG. 23 is another configuration diagram illustrating an access log that is stored in an access log storage means according to the present invention;

FIG. 29 is another process flowchart of a communication agent method according to the present invention;

FIG. 30 is another configuration diagram illustrating information that is stored in an external storage unit of a server device according to the present invention;

FIG. 35 is a schematic diagram of a process flow illustrating a client device, a communication proxy apparatus, and a server device, at the time of a cache hit as a result of issuing an access request from another client device, using a communication agent method according to the present invention;

FIG. 36 is a process flowchart of a client device, a communication proxy apparatus, and a server device, at the time of a cache hit as a result of issuing an access request from another client device, using a communication agent method according to the present invention;

DETAILED DESCRIPTION OF THE INVENTION

Before describing embodiments of the present invention, some basic parts, which are preconditions of the present invention, will be described with reference to FIGS. 3 and 5.

Figure 3:
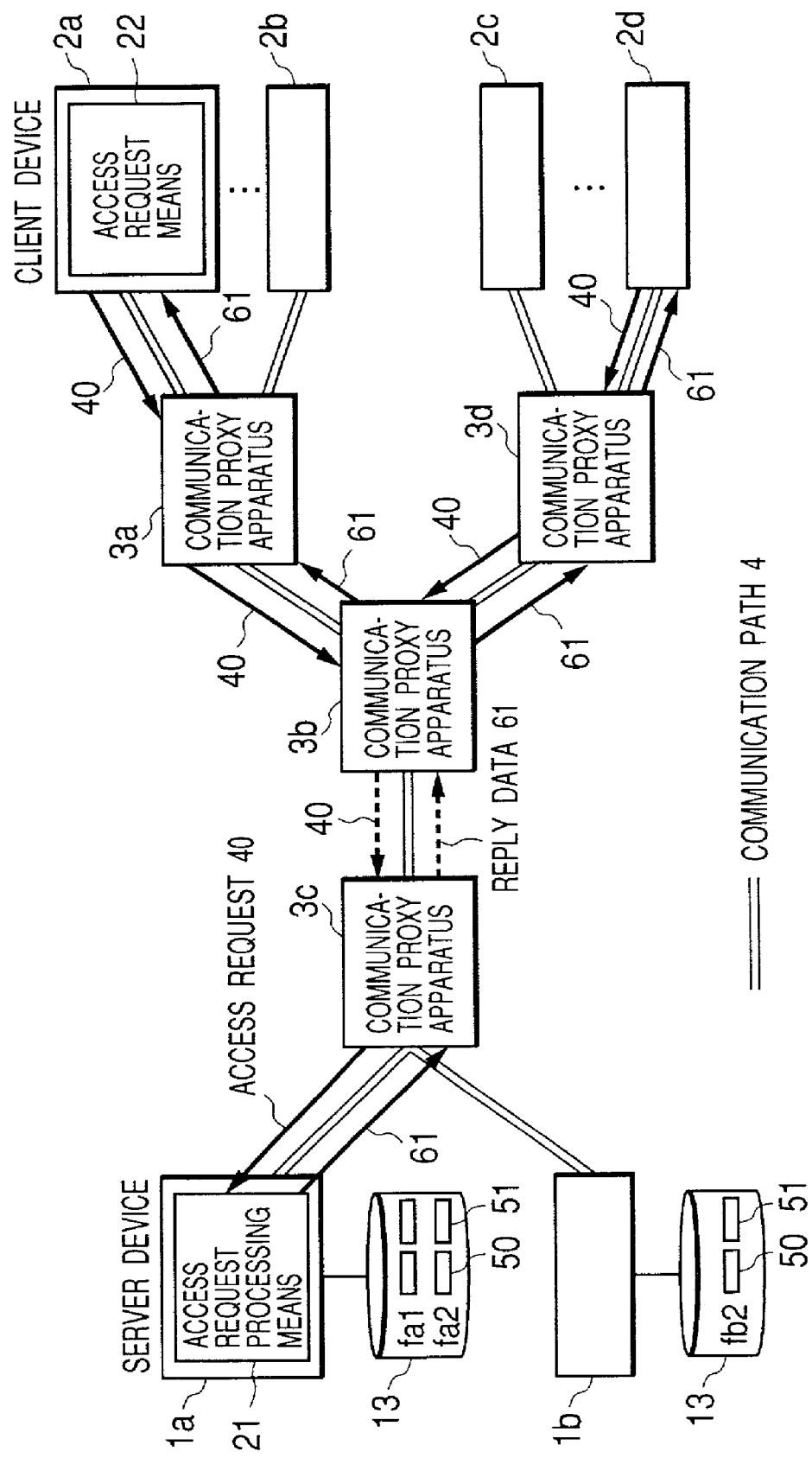
FIG. 3 is a logical configuration diagram illustrating a network system according to the present invention.

FIG. 3 is a logical configuration diagram illustrating a network system relating to a communication proxy apparatus according to the present invention. Server devices 1 (1a, 1b) and client devices 2 (2a through 2d) are connected to each other through communication paths 4 via one or more communication proxy apparatuses 3 (3a through 3d). The communication path 4 is a logical communication channel for transmitting and receiving data between devices that are connected through the communication path 4. One communication path 4 may be realized on a plurality of physical communication lines via one or more router devices, or the like. In contrast with this, a plurality of different communication paths 4 may be realized on one physical communication line. Each of the server devices 1 has an external storage unit 13. One or more pieces of information data 50, and attribute information 51 of the information data 50 are stored in the external storage unit 13.

FIG. 4 shows one example of information stored in the external storage unit 13. Each piece of the information data 50 is stored in the external storage unit 13 of the server device 1, together with the attribute information 51 of the information data 50, which includes update time information 52, caching possibility information 53, and cache expiration time 54. The information data 50 in this server device 1 is managed so that each piece of the information data 50 can be identified by an information data identifier 58 such as a filename. In addition, the server device 1 has an access request processing means 21. The access request processing means 21 provides a function of receiving an access request 40, which is issued for each piece of the information data 50, from the client device 2 and the communication proxy apparatus 3 through the communication path 4, and also a function of sending back reply data 61, which includes the information data 50 corresponding to the access request 40, through the communication path 4.

Figure 5:
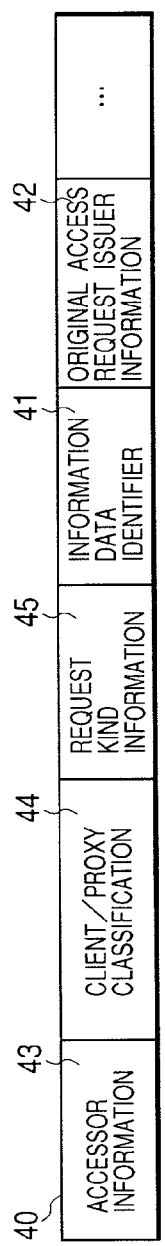
FIG. 5 is a configuration diagram illustrating access request information according to the present invention.

FIG. 5 shows a configuration of the access request 40. The access request 40 includes, for example, accessor information 43, a client/proxy classification 44, request kind information 45, an information data identifier 41, and original access request issuer information 42. The accessor information 43 represents authentication information, such as identification information and a password, which are possessed by the client device 2 that has issued the access request 40, or by the communication proxy apparatus 3 that has issued the request as an agent. The client/proxy classification 44 indicates that the access request 40 is a request from the client device 2 or an agent request from the communication proxy apparatus 3. The request kind information 45 indicates a kind of the access request, that is, whole data access, partial data access, and the like. The information data identifier 41 is information for identifying information data 50 as an access target. The information data identifier 41 is combined information of identification information of the server device 1 as a target, and an information data identifier 58 corresponding to information data 50 stored in the server device 1. The original access request issuer information 42 represents authentication information, such as identification information and a password, which are possessed by an user or client device 2 who issued the access request 40.

In this connection, in the example of an actual Web transfer protocol, communication peer information of the communication path 4 got when the communication path 4 is set, routing information indicating routed communication proxy apparatus 3, optional authentication information, and the like, as a whole, provide information equivalent to the accessor information 43, the proxy/client classification 44, and the original access request issuer information 42 described above.

Here, the prior art will be described with reference to FIG. 6 or 8 as below. The description of the prior art is required to explain embodiments of the present invention.

Figure 6:
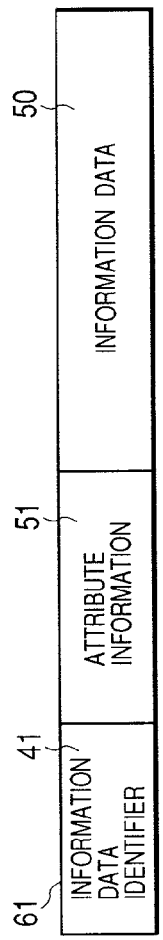
FIG. 6 is a configuration diagram illustrating reply data information for an access request according to the prior art.

FIG. 6 shows a configuration of conventional reply data 61. The conventional reply data 61 includes, for example, an information data identifier 41, attribute information 51 of information data 50, and the information data 50.

A client device has an access request means 22. The access request means 22 provides the following functions: receiving an information data identifier 41 of the information data 50 as an access target from an operator, or the like, of the client device; issuing an access request 40, for an access to the information data 50 on the server device, to a corresponding communication proxy apparatus through the communication path 4; and displaying the information data 50 included in reply data 61, which has been returned from the communication proxy apparatus, for the operator.

Figure 7:
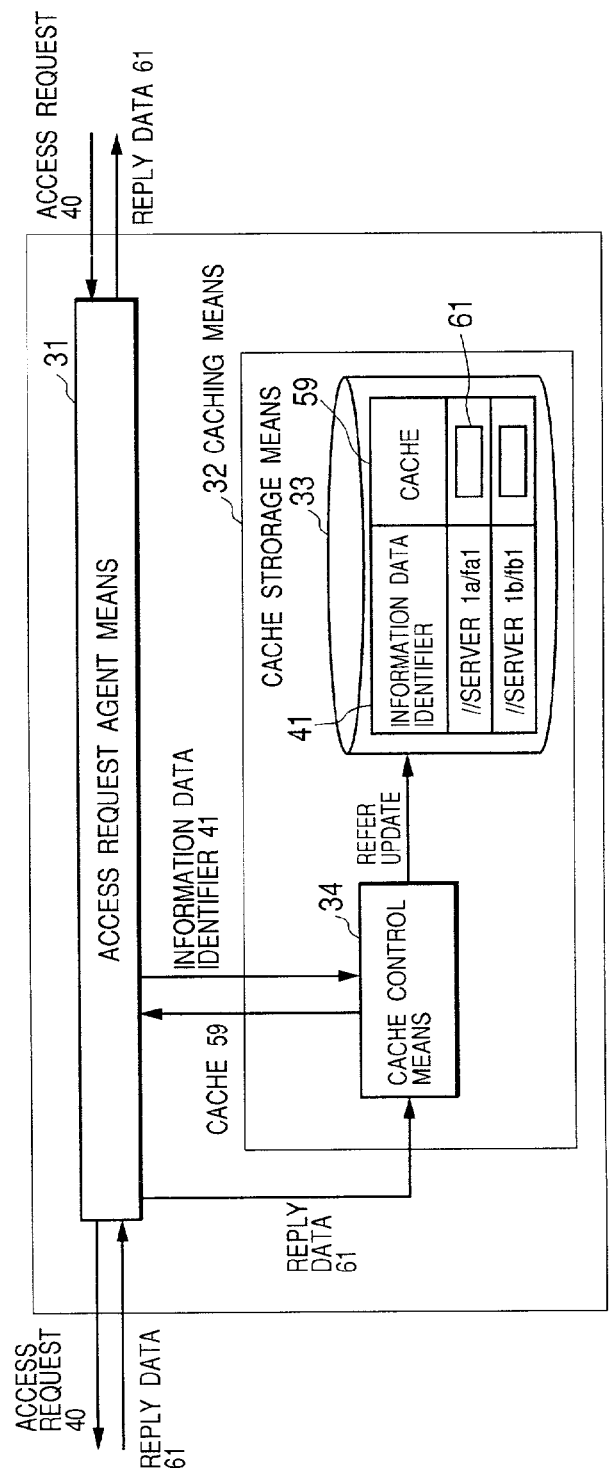
FIG. 7 is a configuration diagram illustrating a communication proxy apparatus according to the prior art.

FIG. 7 shows a configuration example of a conventional communication proxy apparatus. The conventional communication proxy apparatus has an access request agent means 31 and caching means 32. The access request agent means 31 provides the following functions: receiving an access request 40 for an access to the above-mentioned information data 50 on the server device from the client device or another communication proxy apparatus; in response to the access request 40, as an agent, issuing the access request 40 to another communication proxy apparatus or the server device; obtaining reply data 61 including the requested information data 50 and attribute information 51 of the information data; and returning the obtained reply data 61 to the requester. Moreover, in a certain condition, the access request agent means 31 holds and controls the obtained reply data 61, which has been got through the agent processing, as a cache 59 using a caching means 32.

When receiving the above-mentioned access request 40, the access request 40 is not always transmitted as an agent request. If this cache control judges that the reply data 61, which has been held as the cache 59, is available, the access request 40 is not transmitted, but the cache 59 is returned to the requester as latest reply data 61. The caching means 32 comprises a cache storage means 33 and a cache control means 34. The cache storage means 33 has a function of holding the information data 50, which has been obtained by the above-mentioned access request agent means 31, and the reply data 61, which includes the attribute information 51 of the information data, as the cache 59. The cache control means 34 controls the cache 59, which is held in the cache storage means 33, to enable an access to each cache 59 using the information data identifier 41 corresponding to each information data 50 as a key. In addition to it, the cache control means 34 provides a function of replacing the cache 59 under the condition of limited storage capacity.

Figure 8:
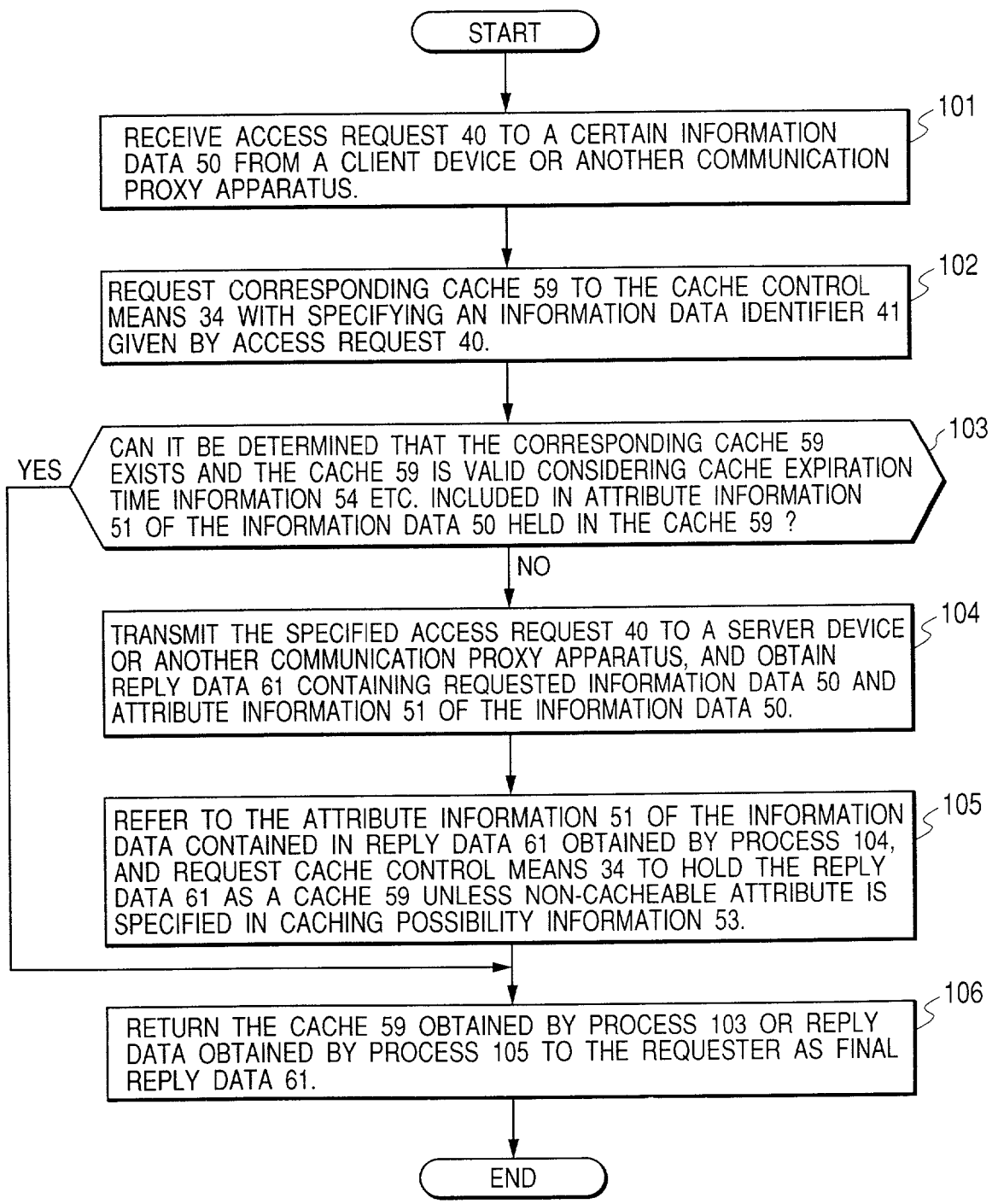
FIG. 8 is a process flowchart of a access request agent means that is used for an access request for information data in a communication proxy apparatus according to the prior art.

FIG. 8 is a process flow of the access request agent means 31 for handling the access request 40, which requests to access the information data 50 from the client device or another communication proxy apparatus, in the conventional communication proxy apparatus.

In the first place, the access request agent means 31 of the communication proxy apparatus receives an access request 40 for certain information data 50 from the client device or another communication proxy apparatus through the communication path 4 (process 101). Next, the access request agent means 31 requests the corresponding cache 59 to the cache control means 34, with specifying the information data identifier 41 given by the access request 40 (process 102). If it can be determined that the corresponding cache 59 exists, and that the cache 59 is available, judging from information including the cache expiration time information 54, etc. included in the attribute information 51 of the information data 50 held in the cache 59, the cache 59 is set as reply data 61 for the above-mentioned access request 40 before the process jumps to a process 106 (process 103). If the corresponding cache 59 does not exist, or if it cannot be determined whether or not the cache is available, the specified access request 40 is transmitted to the server device or another communication proxy apparatus to obtain the reply data 61 that includes the requested information data 50 and the attribute information 51 of the information data 50 (process 104). When referring to the attribute information 51 of the information data, which is included in the reply data 61 obtained by process 104, if a non-cacheable attribute is not specified in the caching possibility information 53, the cache control means 34 is requested to hold the reply data 61, as a cache 59, in the cache storage means 33 (process 105). Finally, the reply data 61 obtained in the process 103 or the process 105 is returned to the requester through the communication path 4, and then the process ends (process 106).

The following describes embodiments of the present invention with reference to drawings.

A configuration example of a network system according to the present invention is shown in FIG. 3.

Server devices 1 (1a, 1b) and client devices 2 (2a through 2d) are connected to each other through communication paths 4 via one or more communication proxy apparatuses 3 (3a through 3d). The communication path 4 is a logical communication channel for transmitting and receiving data between devices that are connected through the communication path 4. One communication path 4 may be realized on a plurality of physical communication lines via one or more router devices, and the like. In contrast with this, a plurality of different communication paths 4 may be realized on one physical communication line.

Figure 2:
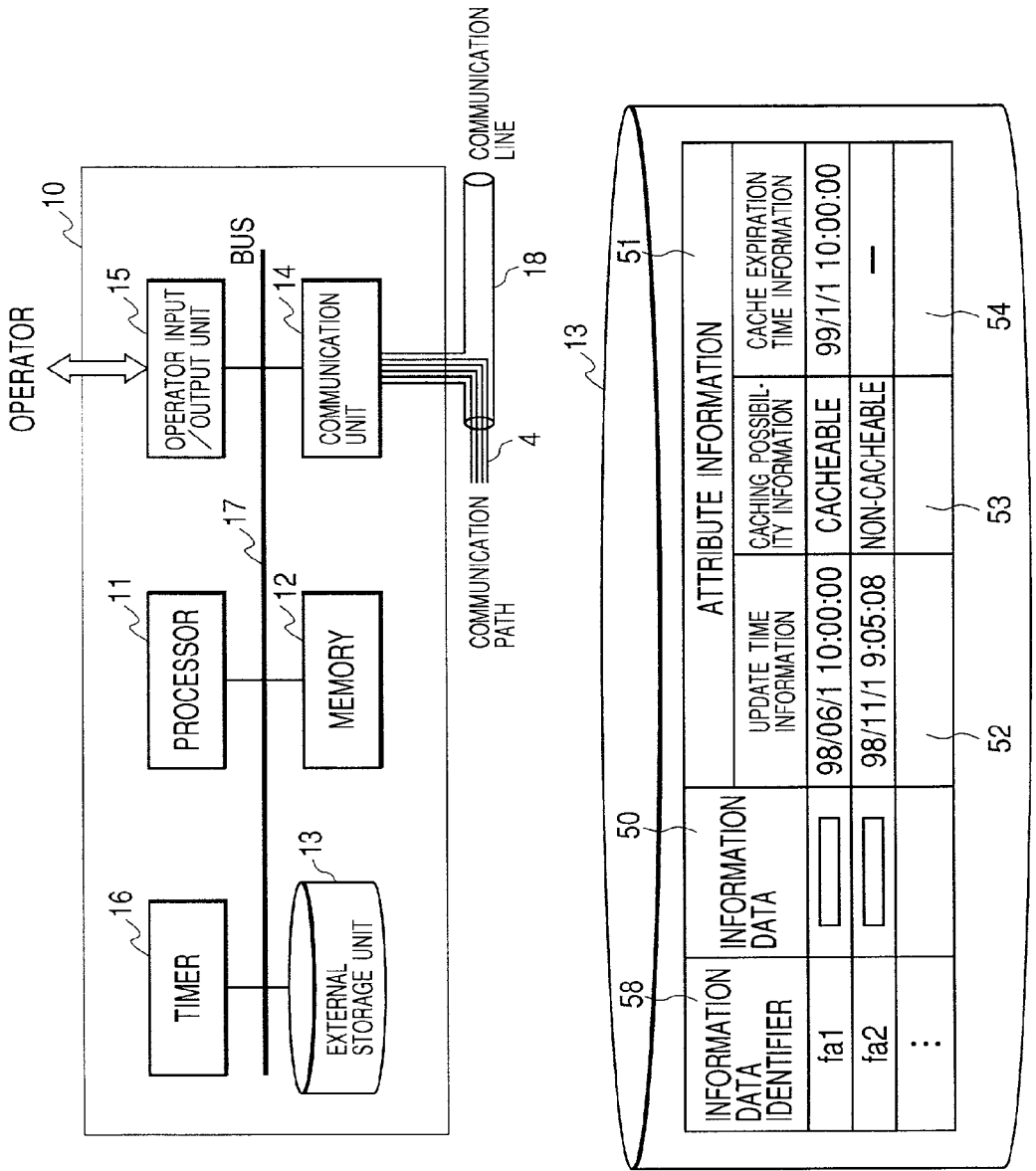
FIG. 2 is a configuration diagram illustrating an information processing unit that is used as a server device, a client device, and a communication proxy apparatus according to the present invention.

Each of the server device 1, the client device 2, and the communication proxy apparatus 3 is physically configured using, for example, a general information processing unit 10. To be more specific, as shown in FIG. 2, a general information processing unit 10 is configured as a device in which for example the following are connected through a bus 17 for exchanging data: a processor 11 for executing an information processing program; a memory 12 for storing the information processing program, which is being executed, and data; the external storage unit 13 for storing the information processing program and data semi-permanently; a communication unit 14 for providing a physical communication line 18, which is connected to other information processing units, with the logical communication path 4; an operator input/output unit 15 by which an operator is provided with input/output means; and a timer 16 that has a function of providing current time information, and a function of starting processing with periodical or specified timing. A variety of processing means described below, which are provided in the server device 1, the client device 2, and the communication proxy apparatus 3, may be realized using a special hardware mechanism. However, as one embodiment, each of the processing means is realized by a program. In other words, a program, which provides a function of each processing means, is stored in the memory 12; and executing the program by the processor 11 through the bus 17 realizes each processing means. In addition, some storage means in the communication proxy apparatus described below are realized using a part of the memory 12 or a part of the external storage unit 13. Moreover, instructions given to an individual action instruction means 72, a hierarchical execution means 84, and a program load means 79, which will be described below, are performed through the operator input/output unit 15 or the logical communication path 4 that is realized on the communication line 18 by the communication unit 14.

As regards internal configurations of the server device 1 and the client device 2, as shown in FIG. 4, one or more pieces of information data 50, together with the attribute information 51 of the information data 50, which includes the update time information 52, the caching possibility information 53, the cache expiration time 54, are stored and managed in the external storage unit 13 of the server device 1 so that the information data 50 can be identified by an information data identifier 58 such as a filename. In addition, in the server device 1, there is an access request processing means 21 for handling an access request 40 for the information data 50 from the client device 2 or the communication proxy apparatus 3. On the other hand, in the client device 2, there is an access request means 22 for issuing an appropriate access request 40 to the communication proxy apparatus 3 in response to an information data identifier 41 of the information data 50 as an access target, which is given by the operator, or the like. In this connection, the access request 40 is configured by the information shown in FIG. 5.

The server devices 1 have an external storage unit 13. One or more pieces of information data 50, and the attribute information 51 of the information data 50, are stored in the external storage unit 13. FIG. 4 shows one example of information stored in the external storage unit 13. Each piece of the information data 50 is stored in the external storage unit 13 of the server device 1, together with the attribute information 51 of the information data 50, which includes the update time information 52, the caching possibility information 53, and the cache expiration time information 54. The information data 50 in this server device 1 is managed so that each piece of the information data 50 can be identified by an information data identifier 58 such as a filename. In addition, the server device 1 has an access request processing means 21. The access request processing means 21 provides a function of receiving an access request 40, which is issued for each piece of the information data 50, from the client device 2 and the communication proxy apparatus 3 through the communication path 4, and also a function of sending back reply data 61, which includes the information data 50 corresponding to the access request 40, through the communication path 4.

Figure 1:
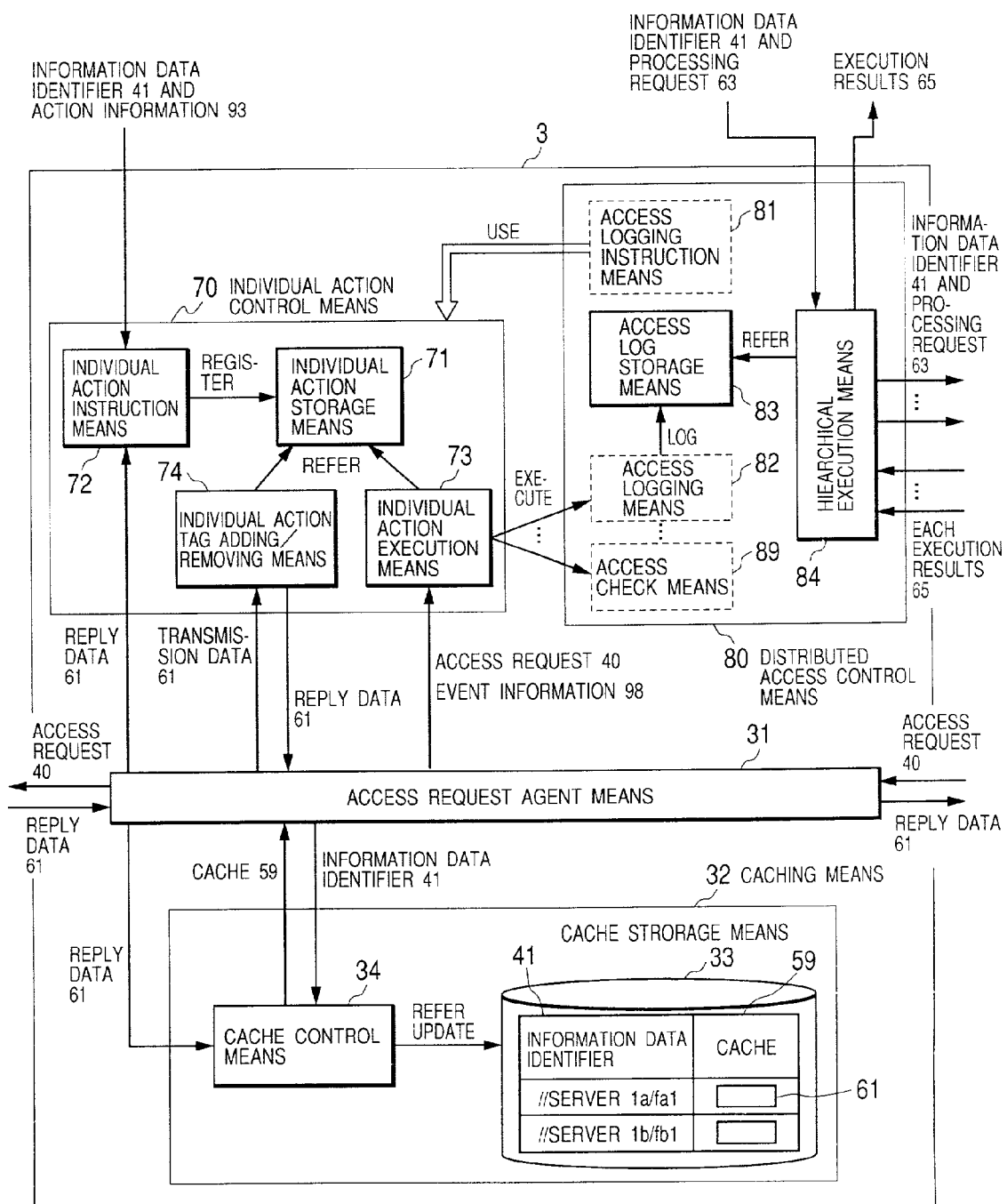
FIG. 1 is a configuration diagram illustrating a communication proxy apparatus according to the present invention.

FIG. 1 shows a configuration example of a communication proxy apparatus 3 according to the present invention. The communication proxy apparatus 3 according to the present invention comprises an individual action control means 70 and a distributed access control means 80, in addition to the access request agent means 31 and the caching means 32 that are included in the conventional communication proxy apparatus shown in FIG. 7.

The access request agent means 31 provides the following functions: receiving an access request 40, which requests to access the information data 50 on server device 1, from the client device 2 or another communication proxy apparatus 3; in response to the access request 40, as an agent, issuing the access request 40 to another communication proxy apparatus 3 or the server device 1; and returning the reply data 61, which has been acquired as a result of the agent request, to the requester. Moreover, in a certain condition, the access request agent means 31 holds the obtained reply data 61, which has been got through the agent processing, as a cache 59 using the caching means 32. When receiving the above-mentioned access request 40, the access request 40 is not always transmitted as an agent request. If this cache control judges that the reply data 61, which has been held as the cache 59, is available, the access request 40 is not transmitted, but the cache 59 is returned to the requester as latest reply data 61.

The access request agent means 31 according to the present invention is different from the prior art on the following point: the individual action control means 70 and the distributed access control means 80, which are newly provided by the present invention, are activated as necessary at certain timing. Details will be described later.

The caching means 32 stores and manages the reply data 61, which has been received from the server device 1 or the communication proxy apparatus 3, as a cache 59 so that the access request agent means 31 described above can access the reply data 61 afterward using the corresponding information data identifier 41 as a key. Moreover, in the present invention, there is a case where additional data such as an individual action tag 62 described later is added to the received reply data 61. In the caching means 32 according to the present invention, the reply data 61 containing the additional data is totally managed as a cache 59.

The individual action control means 70 further comprises individual action storage means 71, the individual action instruction means 72, individual action execution means 73, and individual action tag adding/removing means 74.

The individual action storage means 71 holds individual action definition information 90 that defines an action to be executed for specific information data 50. FIG. 9 shows a configuration example of data stored in the individual action storage means 71. In this embodiment, the individual action storage means 71 is configured using a table in which each line entry comprises the individual action definition information 90. Each of the action definition information 90 comprises an information data identifier 41 for indicating target information data 50, action type classification information 92 for indicating a type of an action specifying method described later, and action information 93 that is information on an action actually executed. The action information 93, for example, comprises action identification information 94 for specifying or identifying an action to be executed, an action condition 95 for indicating execution conditions of the action, an action parameter 96 that is a parameter when executing an action, and an action validity term 97 of the action information 93, and the like. An example of the first entry shown in FIG. 9 represents the following: until 10:00 AM on Jan. 1, 1999, access logging should be made at the time of reply data transmission for an access to information data 50 that is identified by //server1a/fa1: and this action definition is registered by an explicit instruction specifying identification information of the information data (described later).

There may be a case where a plurality of different type actions are desired to be executed for the same information data 50. Therefore, there may be a plurality of entries having the same information data identifier 41 in the table in FIG. 9. However, because explanation will become complicated, process flows or the like will be described assuming that a number of entries having the same information data identifier 41 is at most one.

In the embodiment shown in FIG. 9, the individual action definition information 90 includes the action condition 95 and the action validity term 97. These information enables followings: conditions for executing an action and a action expiration time can be specified; and after the expiration time, the individual action definition information 90 can be deleted.

The individual action instruction means 72 provides a function of registering the above-mentioned individual action definition information 90 in the individual action storage means 71 using two kinds of methods as follows: instructing explicitly by an operator or the like using identification information of target information data; and instructing by adding an instruction to information data to be transmitted.

FIG. 10 shows an example of a process flow of processing that is performed by the individual action instruction means 72 according to an explicit instruction in which action information for a target information data is specified using an identification information of the information data. Details of the processing are shown in FIG. 10.

According to another method for instructing an individual action, an individual action tag 62, which shows an action to be executed for information data 50 in each proxy device 3, is added to reply data 61. Then, the reply data 61 is transmitted to instruct the action. FIG. 11 shows a configuration of the reply data 61 according to the present invention. In FIG. 6 illustrating the conventional example, the reply data 61 comprises the information data identifier 41, the attribute information 51 of the information data 50, and the information data 50, and the like. However, as shown in FIG. 11, reply data 61 according to the present invention further comprises an individual action tag 62, which shows an action in each proxy device 3, as an option. FIG. 12 shows a configuration example of the individual action tag 62. In HTTP as a data transmitting/receiving protocol of Web, and in HTML and XML as data description languages that describe Web data, it is prescribed how to specify its data kind. In HTTP, HTML and XML, information data is transmitted with a header or a trailer before and after the data specifying its data kind in character strings. Following the rule, the information data 50 of the above-mentioned reply data 61 and each piece of the attribute information 51 of the information data 50 are transmitted with such headers and trailers to specify their data kinds. Because of it, as a means for distinguishing the individual action tag 62 from the information data 50 and the attribute information 51, the individual action tag 62 is configured to have a form, in which the action information 93 is inserted between an action tag identification header 68 and an action tag identification trailer 69 to identify the individual action tag 62, in the same manner as the header and the trailer that identify the information data 50 and the attribute information 51. To be more specific, in the embodiment shown in FIG. 12, a character string <proxy-action-tag> is used as the action tag identification header 68, a character string </proxy-action-tag> is used as the action tag identification trailer 69. In addition, each field of the action information 93 is also described in the same manner, that is to say, each of the fields is inserted between corresponding header and trailer character strings.

According to the embodiment shown in FIG. 12, the individual action tag 62 can be mixed with the information data 50 described in XML, or the like, when the individual action tag 62 is described as stated above. This produces a following benefit: together with the information data 50, the individual action tag 62 can be stored as a part of the information data 50 in the server device 1 from the beginning.

Figure 13:
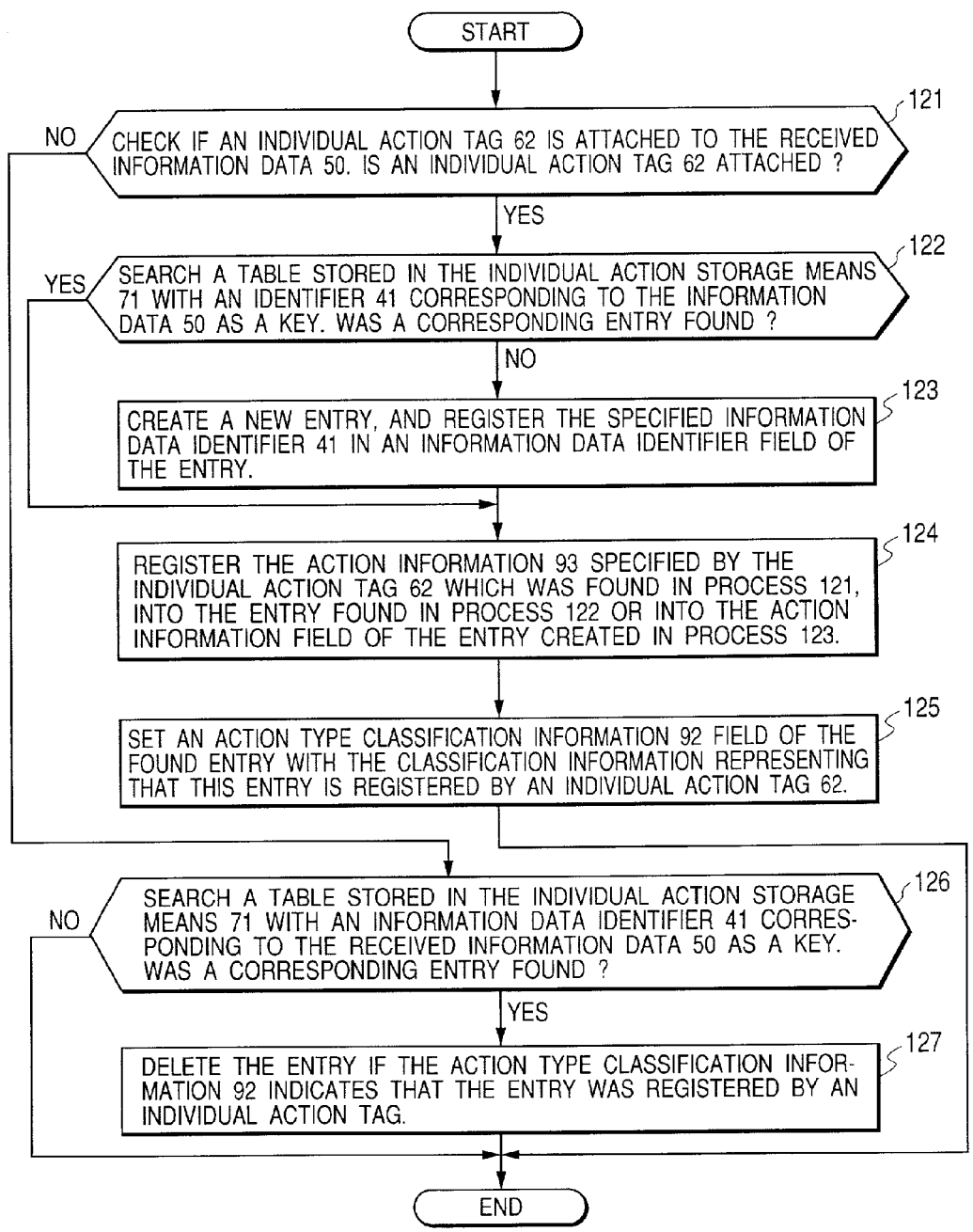
FIG. 13 is a process flowchart of an individual action instruction means based on an individual action tag, which is added to information data, according to the present invention.

FIG. 13 shows an example of a process flow of processing that is performed by the individual action instruction means 72 according to the individual action tag 62 added to the information data 50. This is processing that is activated when the communication proxy apparatus 3 receives the information data 50 from the server device 1 or another communication proxy apparatus 3. Details of the processing are shown in FIG. 13.

In the embodiment shown in FIG. 13, adding the individual action tag 62 to the information data 50 enables to designate the action to a specific information data. Therefore, following benefits are produced: an action can be changed dynamically for the same information data only by changing the individual action tag 62, which is added, beforehand. In addition, if the individual action tag 62 is not added to received data, the individual action definition information 90, which is dynamically registered, is automatically deleted thanks to the individual action tag 62. Therefore deletion of the individual action definition information 90, and also cancellation of action execution, becomes dynamically possible.

The individual action execution means 73 executes an action according to an instruction of each individual action definition information 90 that is held in the individual action storage means 71 described above. More specifically, during a period specified by the action validity term 97 of each individual action definition information 90, an action specified by the action identification information 94 is executed for the information data 50, which is specified by a field for the information data identifier 41, under conditions specified by the action condition 95.

The individual action execution means 73 is utilized by two methods. One utilization method is execution of an action check for a certain event. In this utilization method, when a certain event occurs for certain information data 50, the individual action execution means 73 is called using an access request 40 and event information 98 as parameters. The individual action execution means 73 checks whether or not execution of the action is required. After that, a corresponding action is executed if necessary. The parameters used when executing the action are the access request 40 and the action parameter 96 that is defined in the individual action definition information 90. As regards the event, there are the following examples: an event when the access request 40 for accessing the information data 50 is received; an event when a cache 59 is hit and then it is found out that the cache 59 can be returned as reply data 61; an event when the reply data 61 is received; an event when the reply data 61 is transmitted; an event when the reply data 61 is cached; and the like.

FIG. 14 shows an example of a process flow of action check executed by the individual action execution means 73. Details of the processing are shown in FIG. 14.

In the embodiment shown in FIG. 14, a means for handling event information 98 as a parameter is provided. This produces a benefit of enabling an action to be executed in response to various kinds of events.

Another method for utilizing the individual action execution means 73 is execution of action check using a schedule. In the utilization method, the individual action execution means 73 is called periodically, or at scheduled time, using a timer 16, or the like.

FIG. 15 shows an example of a process flow of initialization processing for action check using a schedule, which is executed by the individual action execution means 73. Because the processing is detailed in FIG. 15, description is omitted.

Figure 16:
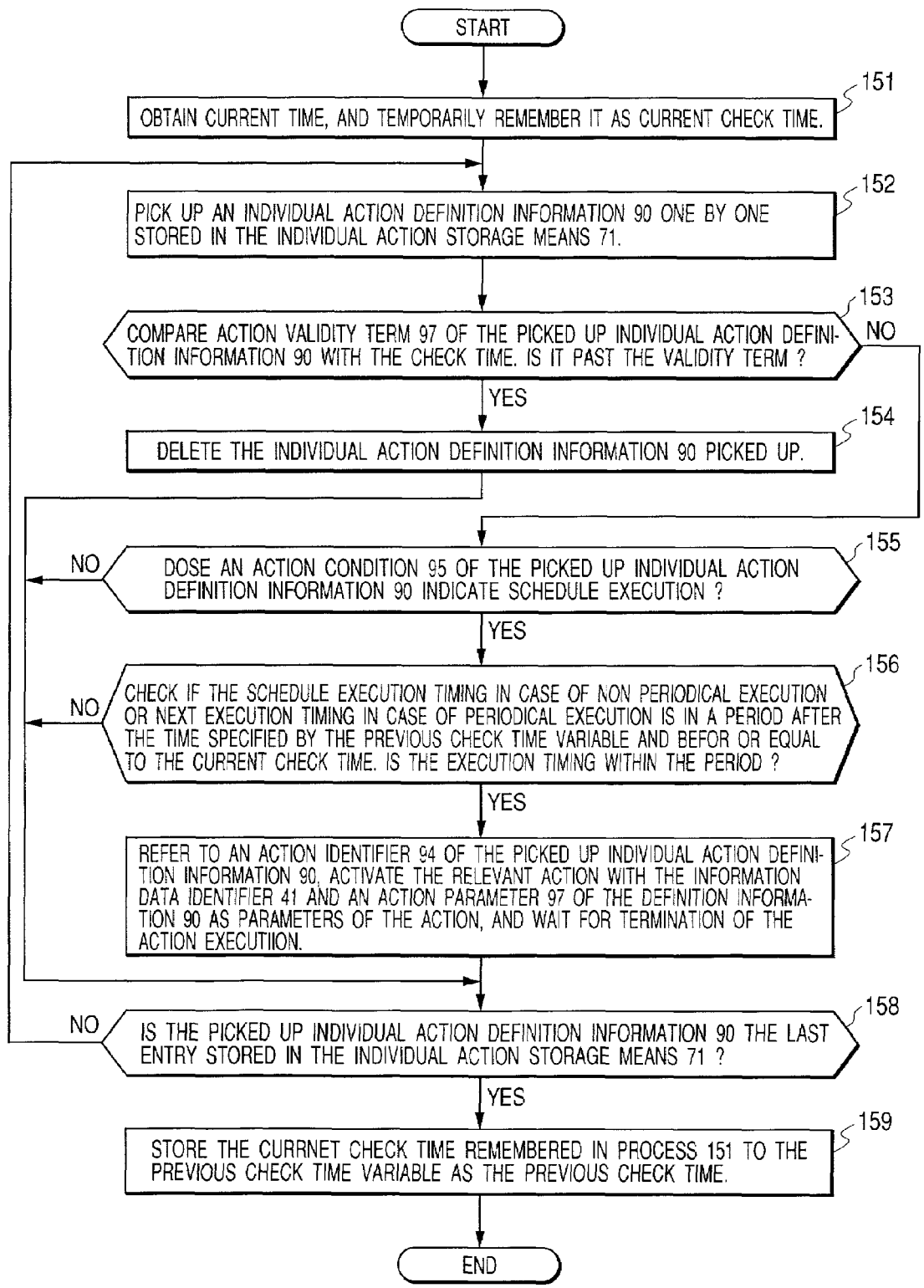
FIG. 16 is a process flowchart of action check processing that is based on a schedule of an individual action execution means according to the present invention, which is invoked by a timer interruption.

FIG. 16 shows an example of a process flow of action check using a schedule, which is called periodically by a timer interrupt using the initialization settings described above, and which is executed by the individual action execution means 73. Details of the processing are shown in FIG. 16.

The embodiment shown in FIGS. 15 and 16 has the following benefits: an action can be executed periodically or according to a schedule as conditions for action execution; in addition to it, using the action validity term 97 in the individual action definition information 90 enables the individual action definition information 90 to be deleted automatically.

The individual action tag adding/removing means 74 adds the above-mentioned individual action tag 62, or removes the attached individual action tag 62 under a certain condition, when transmitting from the communication proxy apparatus 3 the reply data 61, which is received by the communication proxy apparatus 3, or the cache 59 of the received reply data 61.

Figure 17:
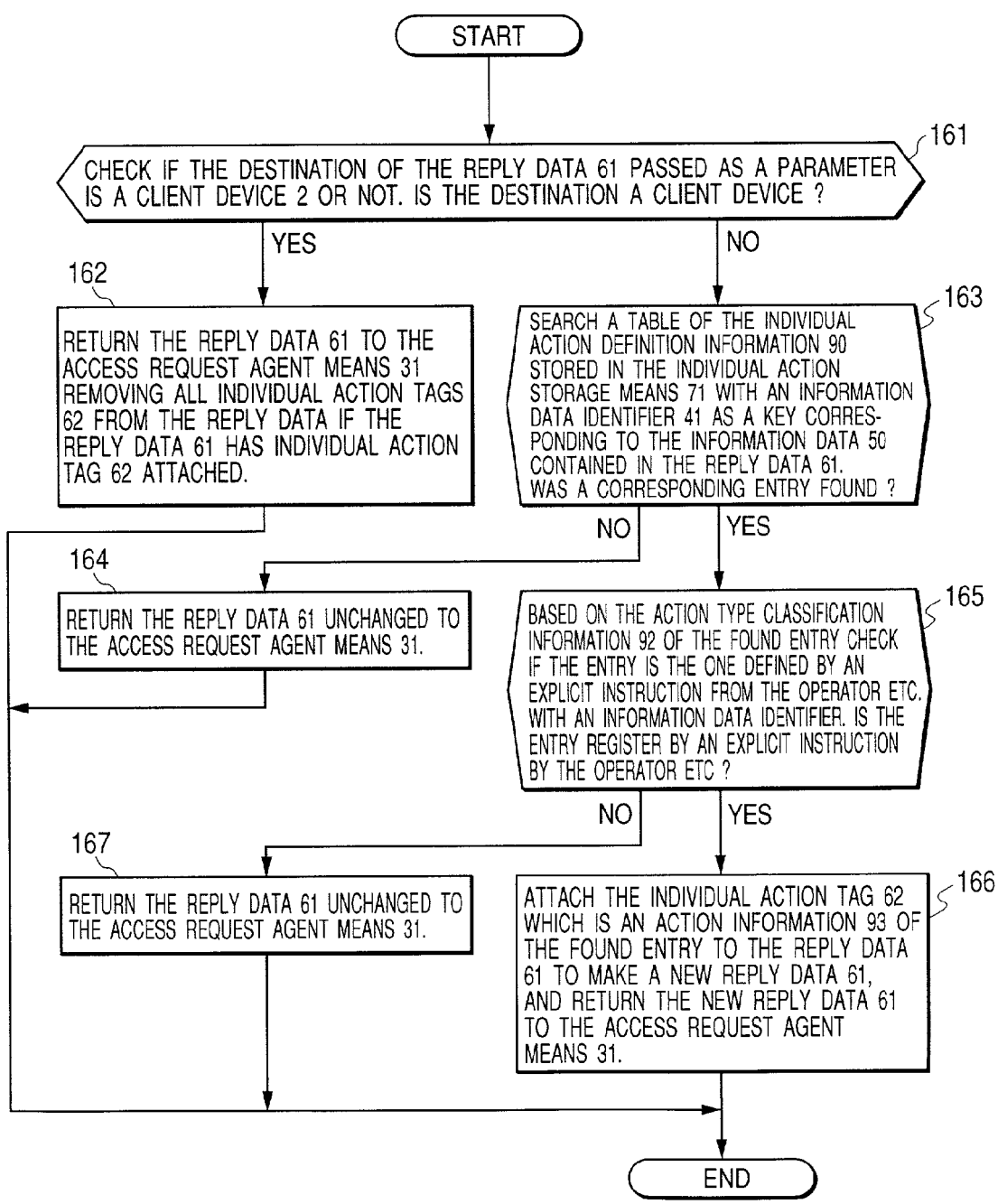
FIG. 17 is a process flowchart of an individual action tag adding/removing means used when transmitting reply data from a communication proxy apparatus according to the present invention.

FIG. 17 shows an example of a process flow of processing executed by the individual action tag adding/removing means 74 when transmitting the reply data 61 from the communication proxy apparatus 3. Details of the processing are shown in FIG. 17.

The individual action control means 70 was described above. Next, the distributed access control means 80, which is another means additional to the communication proxy apparatus 3 according to the present invention, will be described.

The distributed access control means 80 comprises an access logging instruction means 81, an access logging means 82, an access log storage means 83, and a hierarchical execution means 84. Moreover, if access authority is checked in a distributed manner, the distributed access control means 80 additionally has an access check means 89 as an option.

The access log instruction means 81 is a means for instructing execution of an access log for an access request, which is intended to access the specific information data 50 described above. The access logging instruction means 81 may be configured to have only a function peculiar to this means. However, in the embodiment shown in FIG. 1, the above-mentioned individual action control means 70 having more general functions is used as the access logging instruction means 81. To be more specific, the access logging instruction is realized by specifying identification information of the access logging means 82 as the action identification information 94, and by specifying the action condition 95 that the action to make an access logging should be activated, when transmitting reply data in response to an access request for information data to be logged.

The access logging means 82 logs an access of the proxy apparatus 3, the client device 2, or the user, from which the access request is issued, when the communication proxy apparatus 3 handles the access request for the information data 50, for which an access log is instructed by the above-mentioned access logging instruction means 81; more specifically, when transmitting corresponding reply data. In the embodiment shown in FIG. 1, the access logging instruction means 81 is realized as an individual action using the individual action control means 70. Because of it, the access logging means 82 is performed by the individual action execution means 73. From parameters passed from the individual action execution means 73, the access logging means 82 Uses the information data identifier 41, the original access request issuer information 42, the accessor information 43, and the client/proxy classification 44, which are included in the access request 40 parameter, and stores these information in the access log storage means 83.

The access log storage means 83 holds the access log 85 logged by the access logging means 82. FIG. 18 is a configuration example of the access log 85 that is stored in the access log storage means 83. This embodiment shows an example in which each entry of the access log 85 is maintained in the form of a table. The access log 85 comprises the following: the information data identifier 41 included in the above-mentioned access request 40; the original access request issuer information 42; the accessor information 43; the client/proxy classification 44; and access time information 86 indicating accessed date and time. FIG. 18 shows an example of a specific access log 85, which is stored in the access log storage means 83 of the communication proxy apparatus 3b in the network configuration shown in FIG. 3. In the network configuration shown in FIG. 3, the communication proxy apparatus 3b is connected to the communication proxy apparatus 3a and the communication proxy apparatus 3d, and handles the access request 40 from the communication proxy apparatus 3a and 3d as an agent. Therefore, all of the client/proxy classification 44 fields in the access log 85 of the communication proxy apparatus 3b have information indicating a proxy. Each of the accessor information 43 fields has identification information of the communication proxy apparatus 3a or 3d. In addition, each of the original access request issuer information 42 fields has information on a user who actually requested the access. However, because all of the access requests 40 have not always been transmitted to each of the communication proxy apparatuses 3, a whole access log of certain information data 50 cannot be obtained without aggregating an access log of each communication proxy apparatus 3.

It is to be noted that the example shown in FIG. 18 is an example of a simple logging method, by which the access logging means 82 keeps each access log 85 by appending each one to the end of table one by one.

The hierarchical execution means 84 performs the following: receiving an instruction to execute a processing request 63 for certain information data 50; referring to the access log 85 stored in the above-mentioned access log storage means 83; executing the instruction of the process request 63 hierarchically for communication proxy apparatuses 3 of lower levels, which have accessed the information data 50; aggregating execution results 64 that have been obtained from its own communication proxy apparatus 3 and each of the communication proxy apparatuses 3 of lower levels; and returning the aggregated result as execution result 64 from the own communication proxy apparatus 3.

FIG. 19 shows an example of a process flow of processing performed by the hierarchical execution means 84. Details of the processing are shown in FIG. 19.

As one embodiment of a method for expressing a processing request 63 that is passed in processes 171 and 174, as shown in FIG. 20, for example, it may be a program 631 to be executed, which is described in various kinds of programming languages. Moreover, as shown in FIG. 21, it may be identification information 632 of the processing program, or parameters 633 for the processing program, which is installed in the communication proxy apparatus 3 beforehand.

Concerning the method that uses the program itself to instruct a specific action as shown in the embodiment in FIG. 20, it is not necessary to install processing programs to be executed in the communication proxy apparatus 3 beforehand. Therefore, any kind of processing can be performed hierarchically by instructing the processing with a program. On the other hand, as regards the embodiment shown in FIG. 21, although installation of the processing program is required beforehand, only processes installed beforehand can be executed. Because of it, security can be achieved easily. In addition, because an instruction can be given using a small quantity of data including identification information of the processing program, and parameters to the processing program, high-speed execution becomes possible.

FIG. 22 shows an expression example of an execution result 64 returned by a process 175. In this embodiment, the execution result 64 comprises the following: a number of communication proxy apparatuses 651, which indicates a number of communication proxy apparatuses 3 that executes a hierarchical process; and individual execution result information 652, which indicates individual execution result information of each communication proxy apparatus 3 in a process 172. The individual execution result information 652 is repeated a number of times shown in a number of communication proxy apparatuses 651. Furthermore, the individual execution result information 652, which indicates individual execution result information of each communication proxy apparatus 3 in the process 172, comprises the following: a communication proxy apparatus identifier 653, which indicates identification information of each communication proxy apparatus 3; a size of individual result 654, which indicates a size of an individual execution result of the communication proxy apparatus 3 obtained by the process 172; and the individual result data 655.

In the embodiment shown in FIG. 22, for the individual execution result information 652 of each communication proxy apparatus 3, there is the identifier 653 of the communication proxy apparatus 3, and the size of individual result 654 that indicates a size of the individual result data 655. This produces a following benefit: corresponding to various kinds of processing, an arbitrary communication proxy apparatus 3 can return an execution result having an arbitrary size.

In addition, in one configuration example of the access log 85 shown in FIG. 18, the method in which the table is extended by each access log is used. However, as shown in another configuration example of the access log 85 in FIG. 23, the following configuration may also be used: each access log 85 is stored in a table, in which the information data identifier 41 indicating an identifier of accessed information data 50 is used as a key; and each entry of the table points a list that includes effective accessor information 87 and the client/proxy classification 44 in a pair, the former indicating a device or a user that accessed the information data 50. In this case, the effective accessor information 87 is either the original access request issuer information 42 or the accessor information 43, of the above-mentioned access request. If the client/proxy classification 44 is "client", the access request issuer information 42 is set. If the client/proxy classification 44 is "proxy", the accessor information 43 is set. The access logging means 82 adds a new entry to the above-mentioned table only if there is no entry corresponding to target information data 50 when keeping the access log 85. In addition, only if there is no corresponding pair information of the effective accessor information 43 and the client/proxy distinction 44 in the list chained from a corresponding entry, the access logging means 82 adds necessary pair information to the list.

In the embodiment shown in FIG. 23, the communication proxy apparatuses 3, which have accessed the information data 50 can be found by searching the table with the information data identifier 41, and by tracing the list. This produces a following benefit: at the time of the above-mentioned hierarchical execution, high-speed processing is possible to find communication proxy apparatuses 3, to which a processing request should be transferred hierarchically.

The access check means 89 is an optional means for checking access authority at each communication proxy apparatus 3 in a distributed manner. As is the case with the access logging means 82, this access check means 89 is defined as an individual action for certain information data 50, and executed by the individual action execution means 73 of the individual action control means 70. As described above, parameters at the time of execution by the individual action execution means 73 are the access request 40 and the action parameter 96. In this case, the action parameter 96 indicates identification information of a user, a group, or a device, for which an access is permitted. The access check means 89 uses the original access request issuer information 42 and the action parameter 96, which are included in the provided access request 40, to inquire the user information management server 5 whether or not an access is permitted. The user information management server 5 manages and authenticates information on user, group, and device.

Figure 24:
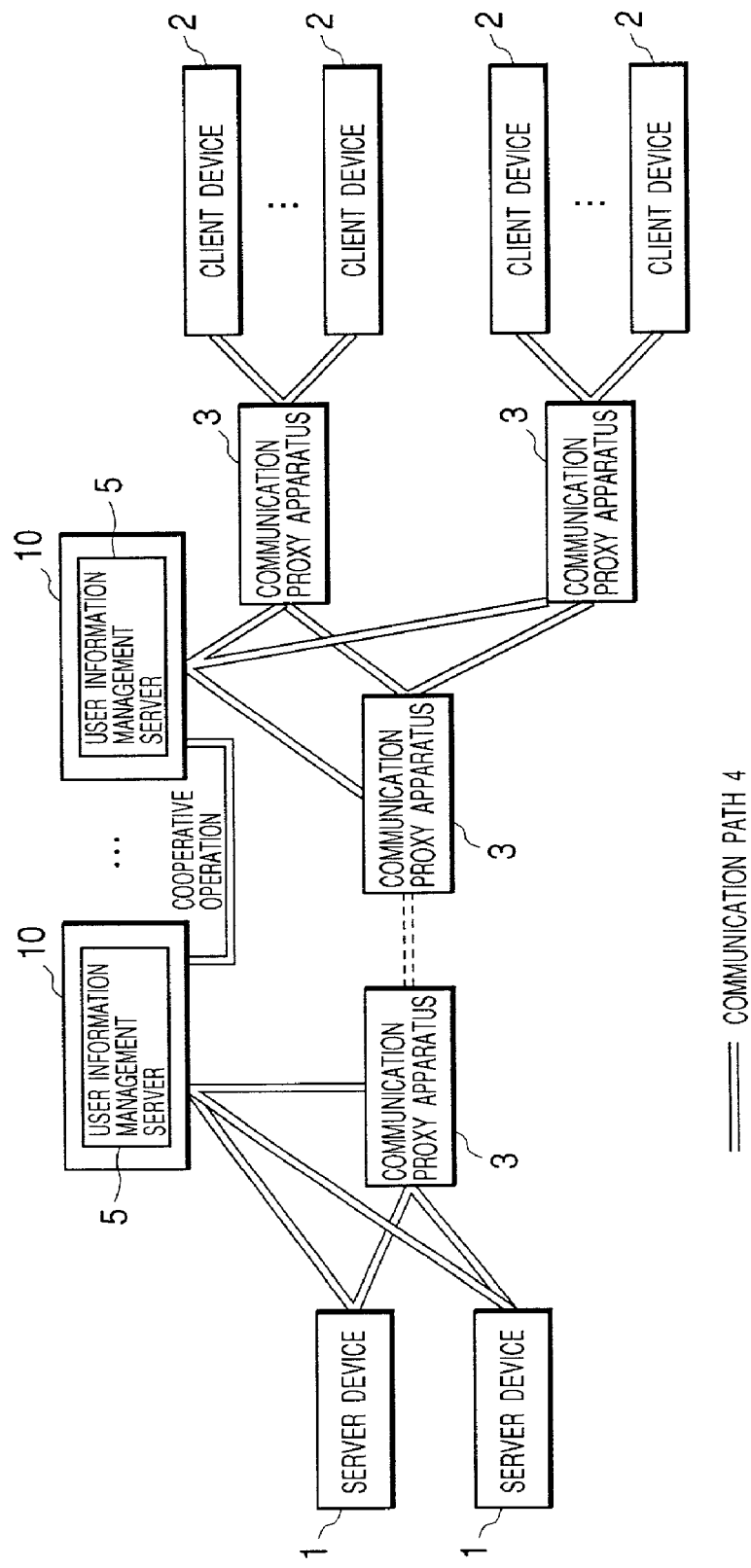
FIG. 24 is a configuration diagram illustrating a network that includes a user information management server according to the present invention.

FIG. 24 is a configuration diagram illustrating a network that includes the user information management server 5. In this embodiment, the user information management server 5 operates on an information processing unit 10, which is connected to each of the communication proxy apparatuses 3 and the server devices 1 through the communication path 4. The user information management server 5 is realized with one or more information processing units 10 using a distributed database management technique as necessary.

Figure 25:
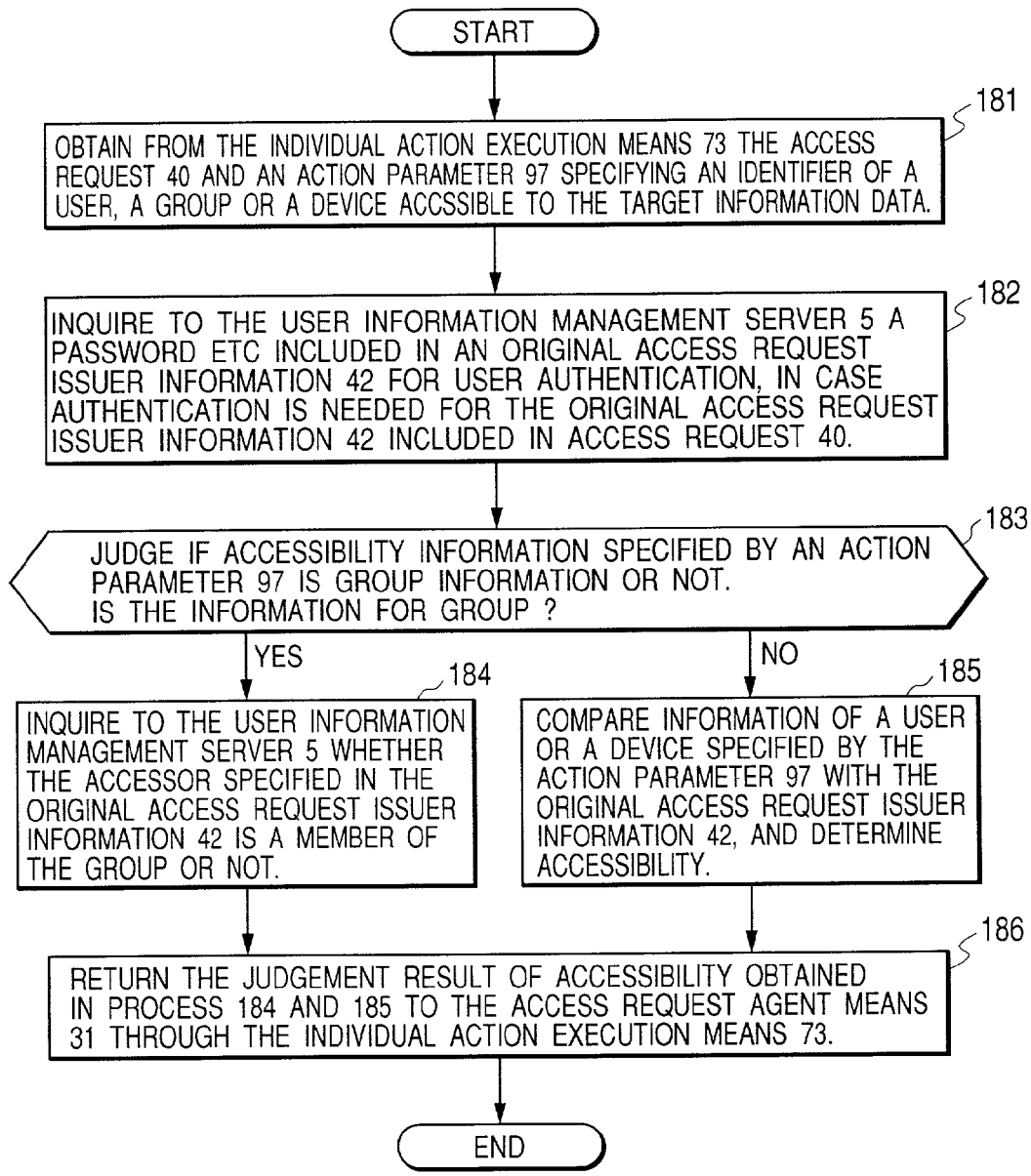
FIG. 25 is a process flowchart of an access authority check performed by an access check means according to the present invention.

FIG. 25 shows an example of a process flow of the access authority check, which is performed when the above-mentioned access check means 89 is invoked from the individual action execution means 73. Details of the processing are shown in FIG. 25.

Figure 26:
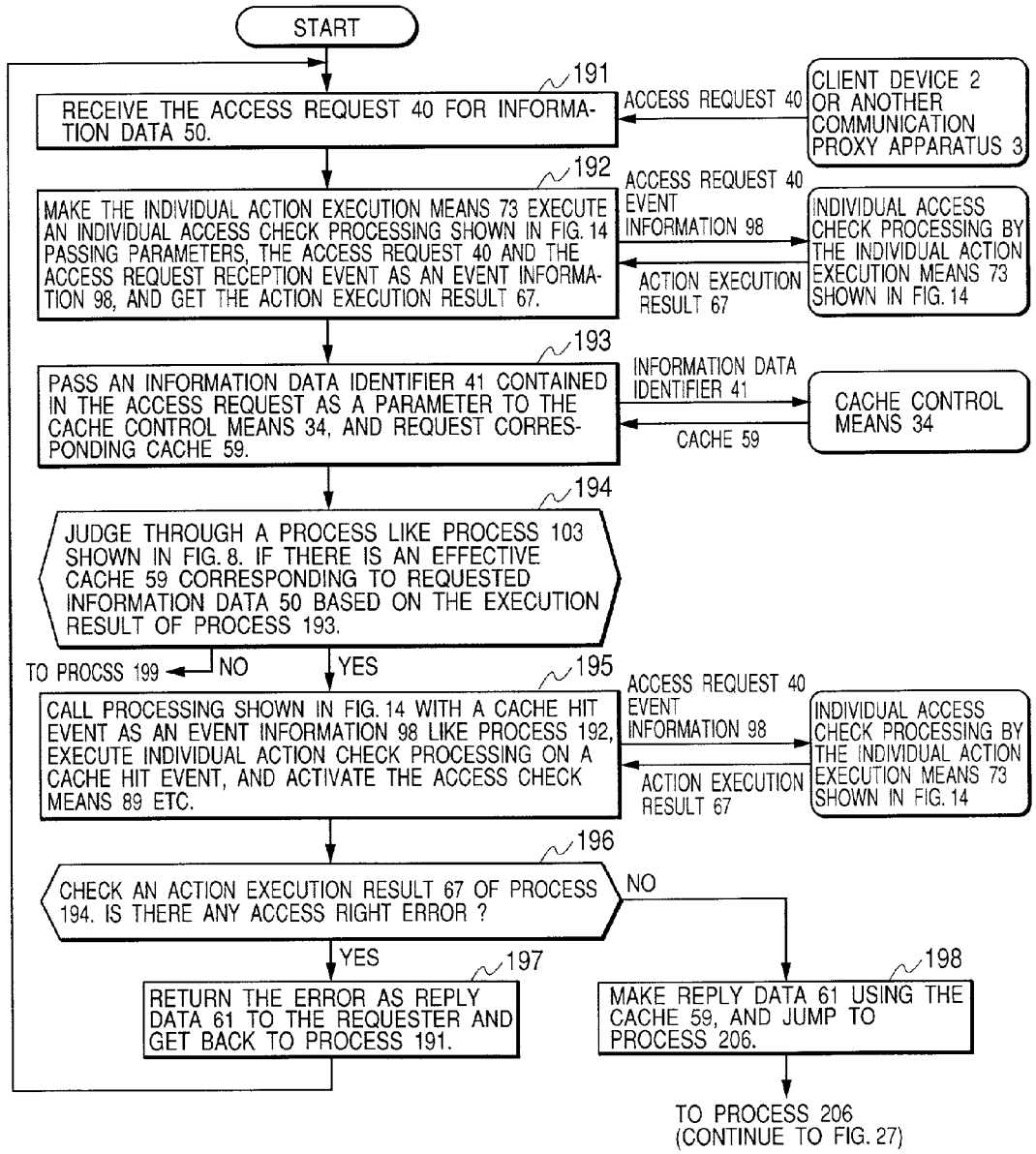
FIG. 26 is a process flowchart (No. 1) of an access request agent means of a communication proxy apparatus according to the present invention.
Figure 27:
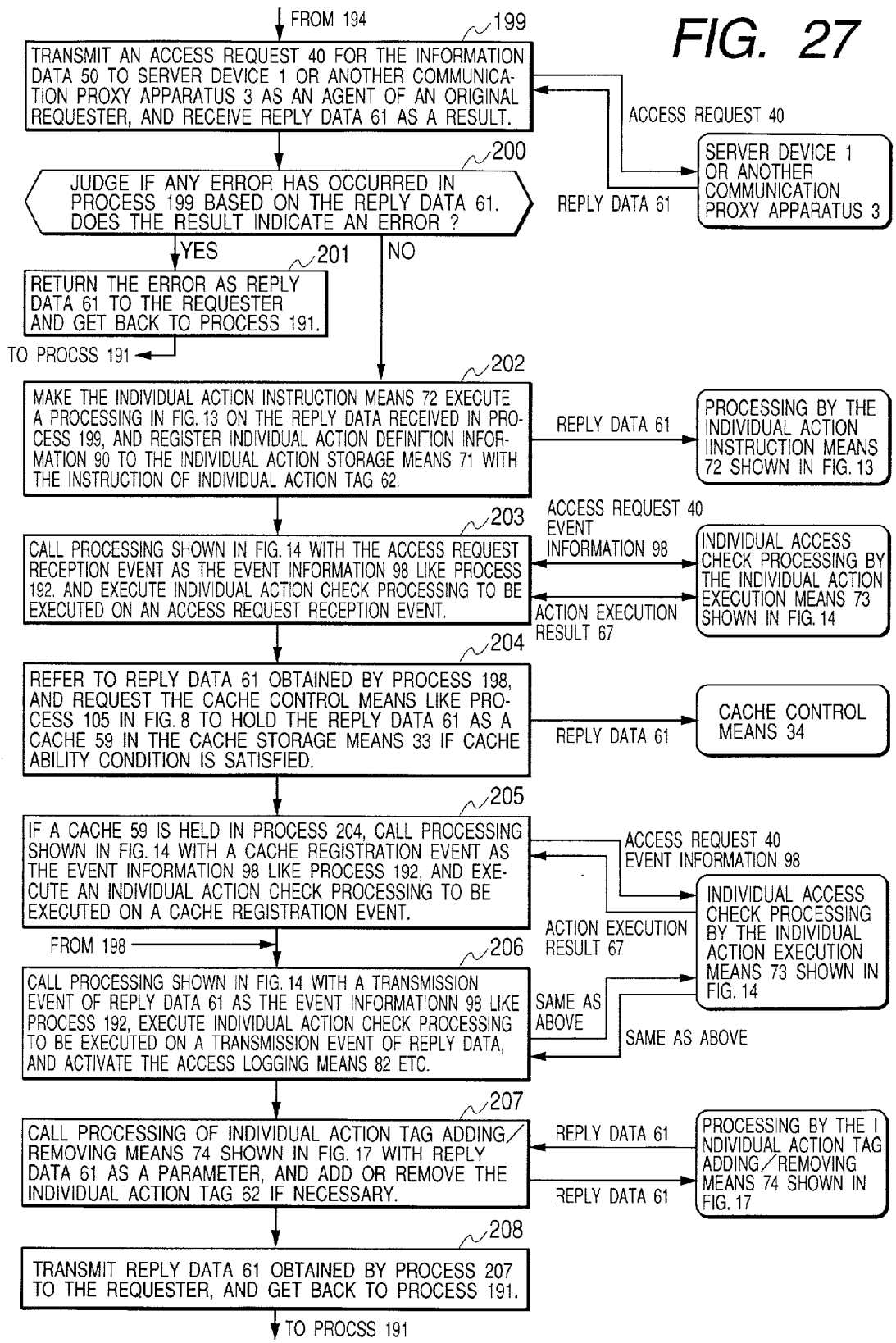
FIG. 27 is a process flowchart (No. 2) of an access request agent means of a communication proxy apparatus according to the present invention.

Next, FIGS. 26 and 27 shows an example of a process flow of processing that is performed by the access request agent means 31 according to the present invention. Details of the processing are shown in FIGS. 26 and 27.

Figure 28:
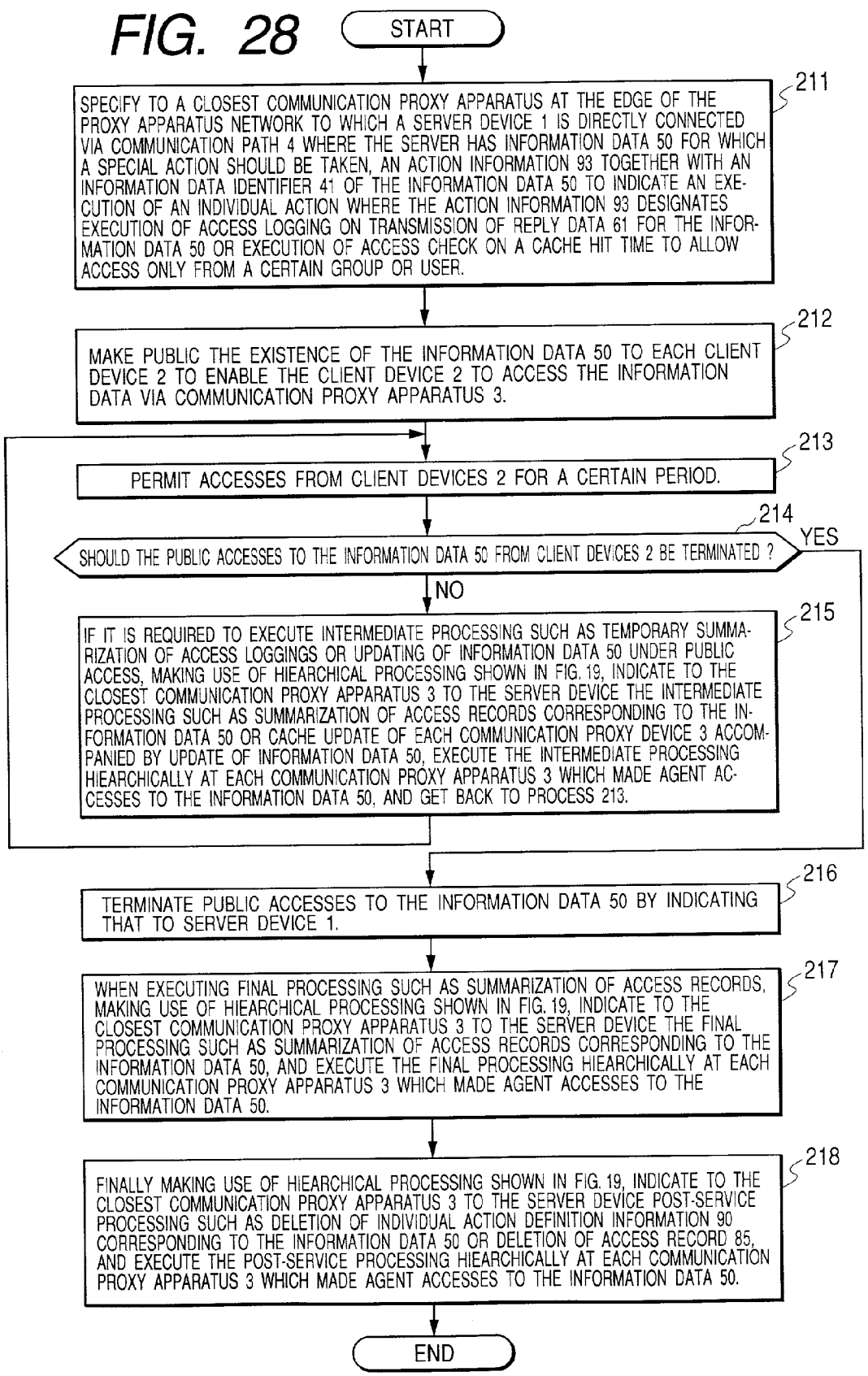
FIG. 28 is a process flowchart of a communication agent method according to the present invention.

Next, FIG. 28 shows an example of a process flow of a communication agent method that uses a communication proxy system configured by the communication proxy apparatus 3 according to the present invention in FIG. 1. Details of the processing are shown in FIG. 28.

In the embodiment shown in FIG. 28, in a process 211, an individual action for the information data 50 is instructed, with an explicit instruction to the communication proxy apparatus 3 on the edge of the server device side specifying identification information of target information data 50. However, a method, in which the server device 1 provides information data 50 having an individual action tag 62 added beforehand, may also be considered.

FIG. 29 shows an example of a process flow of processing according to the method. Details of the processing are shown in FIG. 29. A process 221 shown in FIG. 29 takes the place of the process 211 shown in FIG. 28. Processes after this are the same as processes 212 through 218 in FIG. 28.

FIG. 30 shows a configuration examples of information stored in the external storage unit 13 of the server device 1 according to the present invention, which corresponds to FIG. 29. In an embodiment shown in (a) of FIG. 30, an individual action tag 62 is stored as an option, while associating the individual action tag with each information data 50. In an embodiment shown in (b) of FIG. 30, using the method for expressing the individual action tag 62 shown in FIG. 12, where said individual action tag 62 can be integrated with the information data 50, the individual action tag 62 is attached to the information data 50, and is managed as a part of the information data 50.

As regards the embodiments shown in FIGS. 28 and 29, an individual action specified in each communication proxy apparatus 3 can be executed. Therefore, both of the embodiments are the same on that point. However, according to the embodiment in FIG. 28, the individual action can be executed without changing the information data 50 on the server device 1 side. On the other hand, the embodiment in FIG. 29 has a following benefit: the individual action can be executed regardless of which server device 1 the information data 50 with the individual action tag 62 is placed on, and it is not necessary to find which communication proxy apparatus 3 is an edge communication proxy apparatus 3 for the server device 1.

Next, a process flow of the access request 40, which requests to access the information data 50 on the server device 1, from the client device 2 will be described with reference to FIGS. 31 through 36, taking the network configuration shown in FIG. 3 as an example. In order to make explanation simpler, it is assumed that target information data 50 can be cached, and that no individual action tag 62 is attached to the information data 50 stored in the server device 1.

Figure 31:
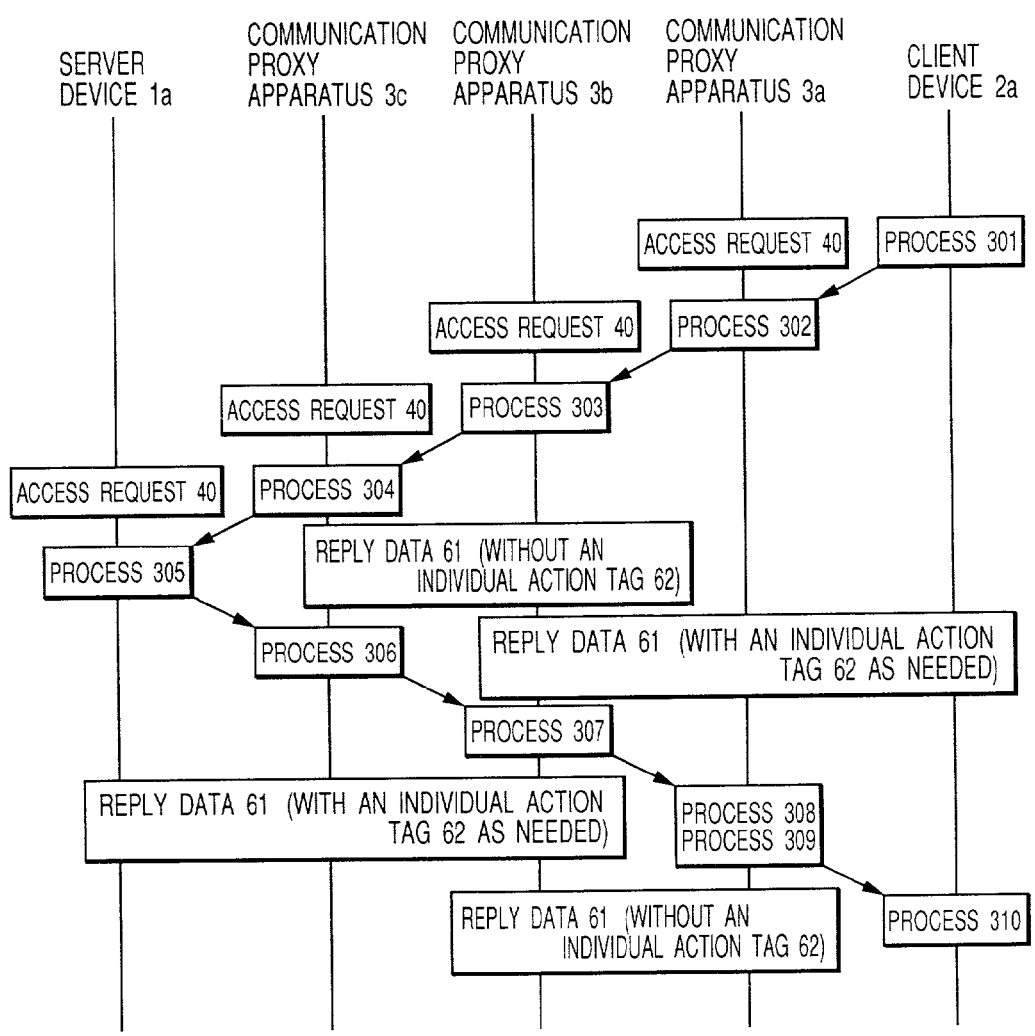
FIG. 31 is a schematic diagram of a process flow illustrating a client device, a communication proxy apparatus, and a server device, at the time of a cache miss, in a case where a communication agent method according to the present invention is used.
Figure 32:
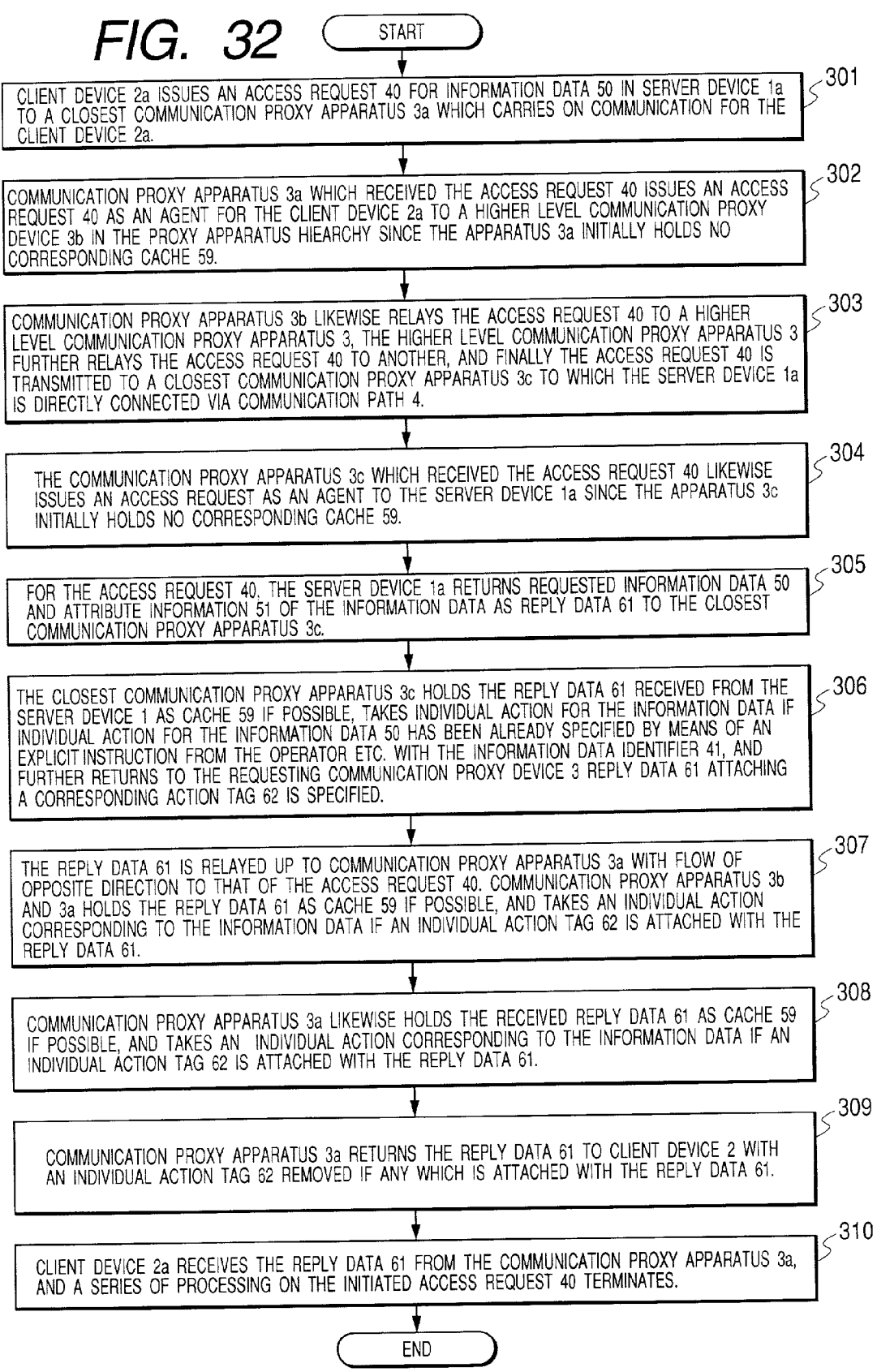
FIG. 32 is a process flowchart of a client device, a communication proxy apparatus, and a server device, at the time of a cache miss, in a case where a communication agent method according to the present invention is used.

In the first place, a process flow of a first time access request to the information data from the client device 2*a* will be described with reference to FIGS. 31 and 32, where each communication proxy apparatus 3 does not have a corresponding cache 59. FIG. 31 is a schematic diagram illustrating a process flow for a case where each communication proxy apparatus 3 does not have a corresponding cache 59. FIG. 32 describes details of each process shown in FIG. 31. Details of the processes are shown in FIG. 32.

In the description of the above-mentioned embodiment, if an individual action tag 62 is attached to the information data 50 stored in the server device 1*a* beforehand, reply data 61, which is returned from the server device 1 and includes the individual action tag 62, is transmitted to the communication proxy apparatus 3*c* as it is in a process 305, and the communication proxy apparatus 3*c* executes an action corresponding to the individual action tag 62 in a process 306.

Figure 33:
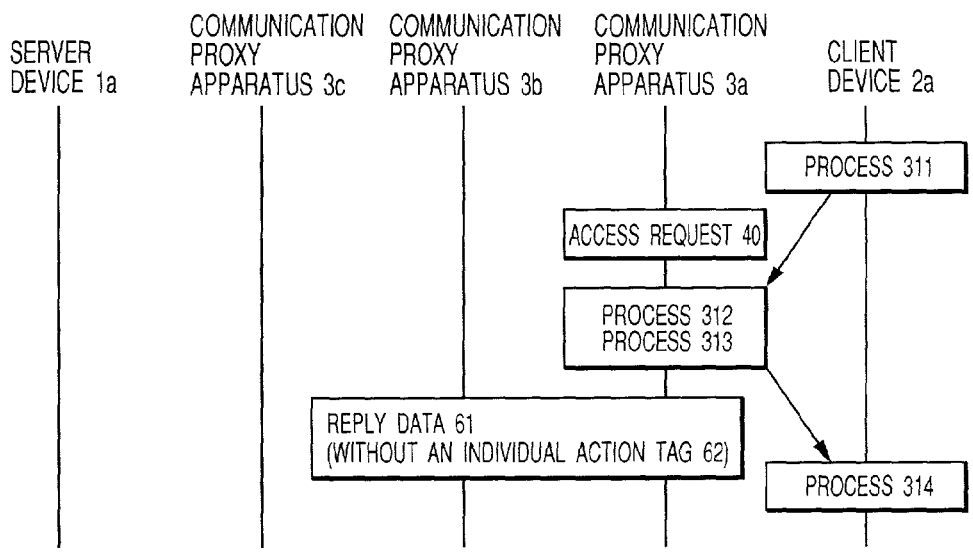
FIG. 33 is a schematic diagram of a process flow illustrating a client device, a communication proxy apparatus, and a server device, at the time of a cache hit as a result of issuing an access request again from the same client device, using a communication agent method according to the present invention.
Figure 34:
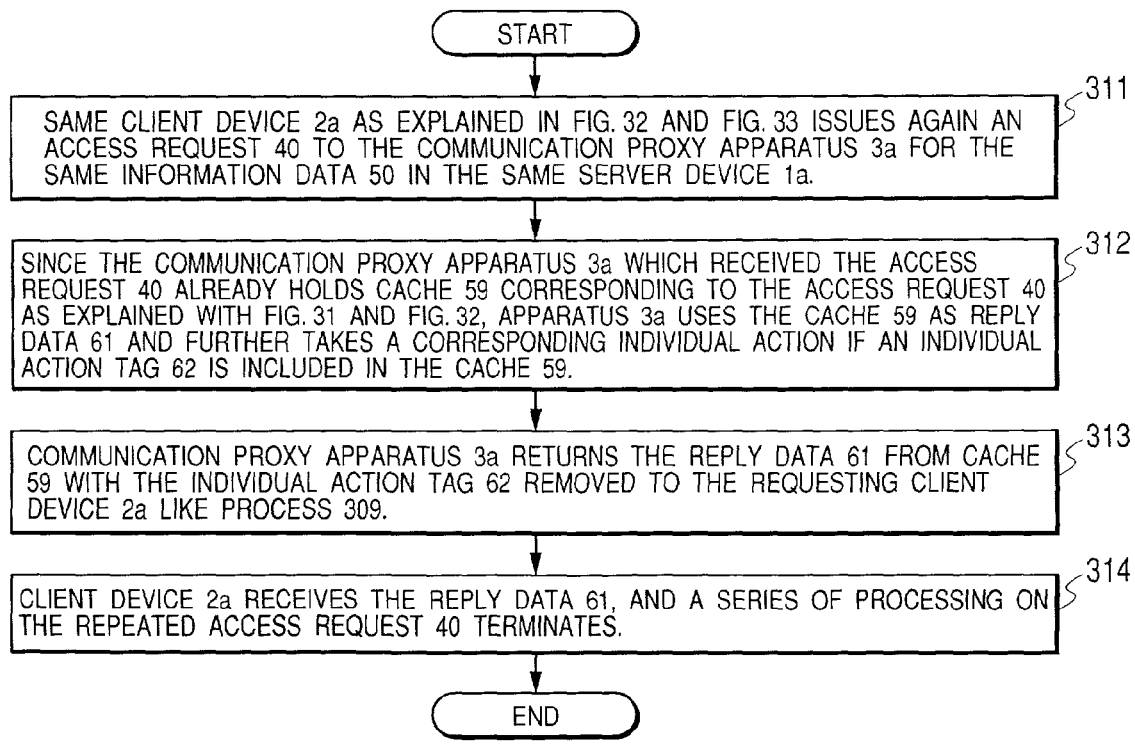
FIG. 34 is a process flowchart of a client device, a communication proxy apparatus, and a server device, at the time of a cache hit as a result of issuing an access request again from the same client device, using a communication agent method according to the present invention.

Next, a process flow for a case where the same client device 2a issues another access request 40 to the communication proxy apparatus 3a again, requesting for an access to the same information data 50 of the same server device 1a, (that is to say, for a case where there is corresponding cache 59) will be described with reference to FIGS. 33 and 34. FIG. 33 is a schematic diagram illustrating a process flow for a case where an edge communication proxy apparatus on the client side has a cache 59 corresponding to an access request 40. FIG. 34 describes details of each process shown in FIG. 33. Details of the processes are shown in FIG. 34. Moreover, with reference to FIGS. 35 and 36, a process flow for a case where another client device 2d issues an access request 40 to the same information data 50 of the same server device 1a will be described. FIG. 35 is a schematic diagram of a process flow illustrating the client device, the communication proxy apparatus, and the server device, at the time of a cache hit for the access request 40 from another client device 2d. FIG. 36 describes details of each process shown in FIG. 35. Details of the processes are shown in FIG. 36.

Figure 37:
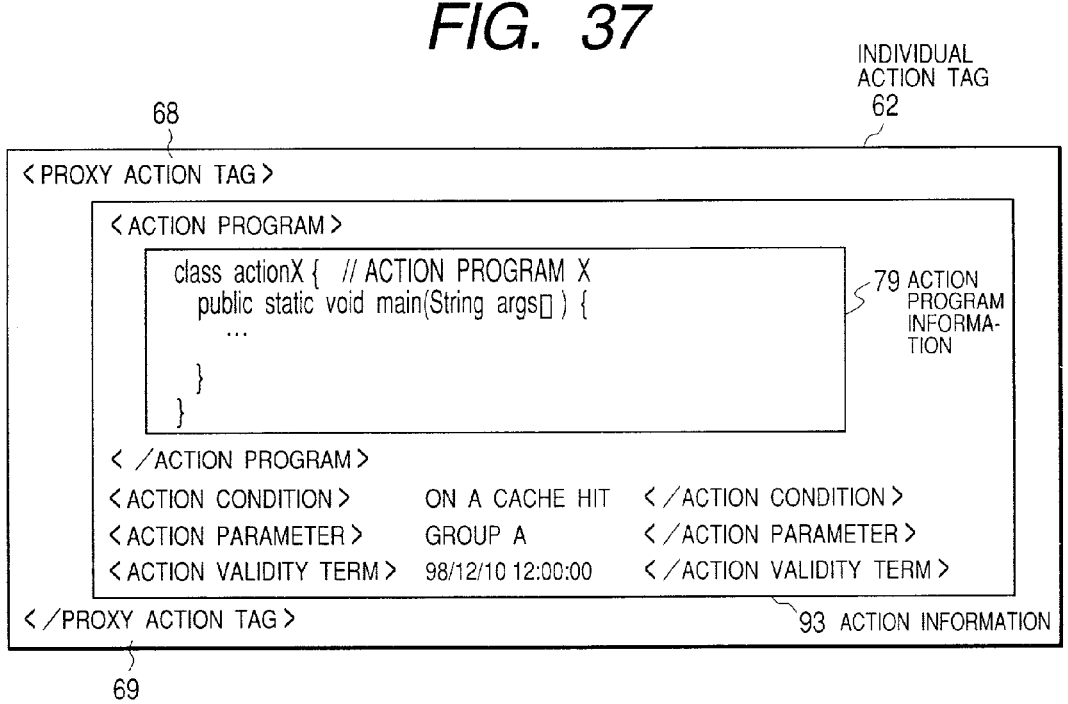
FIG. 37 is a configuration diagram illustrating an individual action tag based on program description according to the present invention.

FIGS. 9 and 12 described above show the embodiment that specifies action information 93 with the action identification information 94, which identifies the means installed beforehand, assuming that a process to be executed as an individual action is installed beforehand in the communication proxy apparatus 3. However, as is the case with the embodiment of the above-mentioned hierarchical execution, there is also an embodiment that uses action program information 79, which uses various kinds of programming languages to describe individual action process itself, instead of the action identification information 94. FIG. 37 shows a configuration example of the individual action tag 62 that uses the action program information 79. In this embodiment, a portion, which corresponds to the action identification information 94 in FIG. 12, is described as action program information 79 that uses a programming language.

Figure 38:
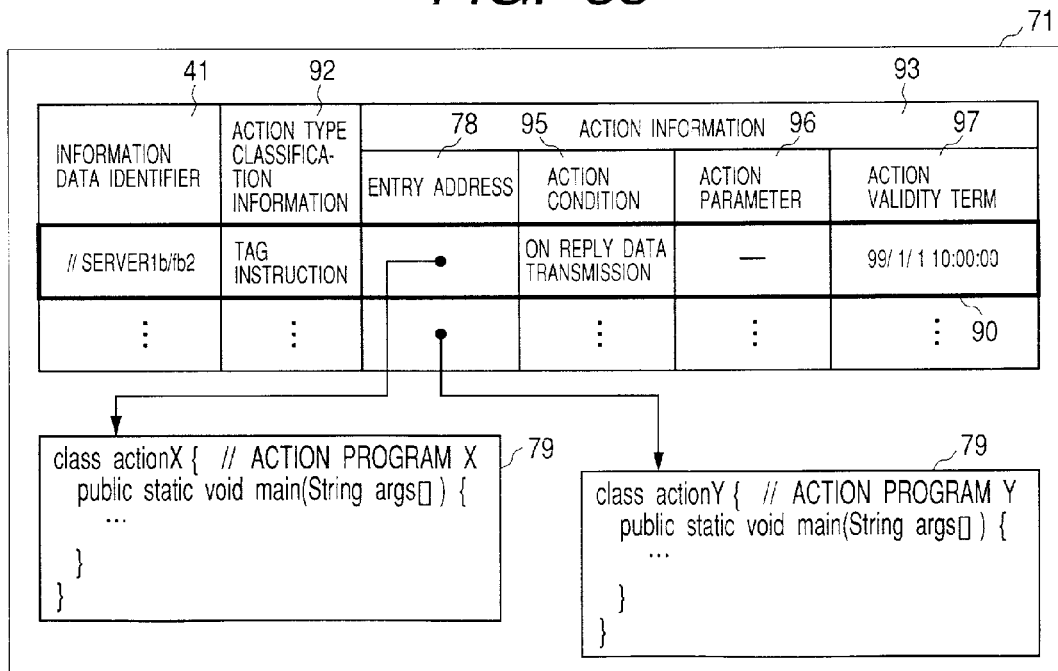
FIG. 38 is a configuration diagram illustrating individual action definition information that uses an action based on a program description according to the present invention.

In addition, FIG. 38 shows a configuration example of individual action definition information 90 to be held in the individual action storage means 71, for a case where the action program information 79 is used. In this embodiment, each action program information 79, which is explicitly instructed using information data identifier 41 or is instructed by the above-mentioned individual action tag 62, is stored in a part of the individual action storage means 71 by the individual action instruction means 72. Moreover, an entry address information 78 field is provided instead of a field that is equivalent to the action identification information 94 of the individual action definition information 90 shown in FIG. 9. When the individual action instruction means 72 stores each action program information 79 in the individual action storage means 71, address information on an entry point of each of the action program information 79 is registered in the field. When executing an action, information specified in the entry address information 78 is used to execute corresponding action program information 79.

Additionally, as another embodiment, there is also the following method: while keeping the individual action definition information 90 in FIG. 9 as it is, means are added to the communication proxy apparatus 3 for dynamically loading action program information to be executed as an individual action and for associating the program information 79 with action identification information 94.

Figures 39, 40:
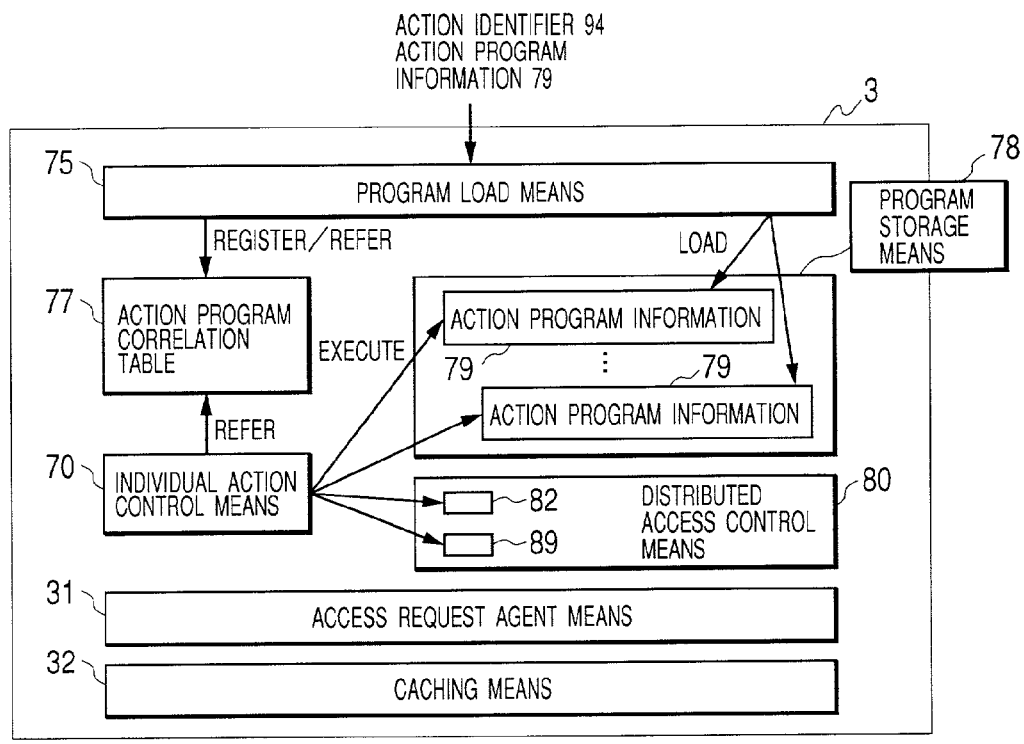
FIG. 39 is a configuration diagram illustrating a communication proxy apparatus having a program load means according to the present invention.
FIG. 40 is a configuration diagram illustrating an action program correlation table according to the present invention.

FIG. 39 is a configuration diagram illustrating the communication proxy apparatus 3 having a program load means 75, according to the present invention. In this embodiment, means and a table, which are newly added to the communication proxy apparatus 3 shown in FIG. 1, are the program load means 75, a program storage means 76, and an action program correlation table 77. In the first place, the program storage means 76 is a means for holding loaded action program information 79. As shown in FIG. 40, the action program correlation table 77 holds a relationship between the action identification information 94 and the entry address information 78 of the loaded action program information 79. In the same form, the table 77 also manages the access logging means 82, and the access check means 89 which are provided in the distributed access control means 80. When the individual action control means 70 executes an action, the individual action control means 70 refers to the action program correlation table 77, finds out an entry address of a program, which should be executed, using the action identification information 94 described in the individual action definition information 90, and thereby executes the corresponding program. The program load means 75 receives an instruction from an operator, or the like, loads a program for action, and then associates it with specified action identification information 94.

Figure 41:
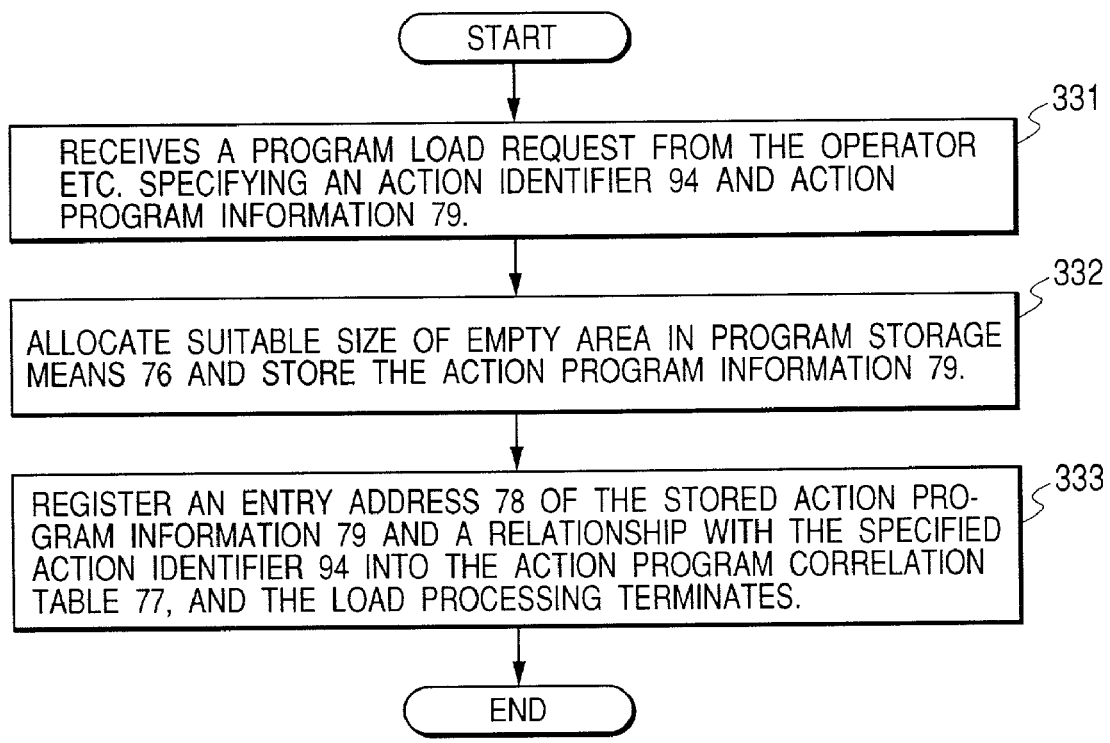
FIG. 41 is a process flowchart of a program load means according to the present invention.

FIG. 41 shows an example of a process flow of a program loading process executed by the program load means 75. Details of the process are shown in FIG. 41.

According to the embodiment shown in FIGS. 37 through 41, a following benefit is produced: dynamical loading becomes possible without installing processing means for executing individual actions beforehand to each communication proxy apparatus 3. In addition, according to the embodiment shown in FIGS. 39 and 40, a benefit of reducing a quantity of data of the individual action tag 62 added to the information data 50 is produced, which enables high-speed agent processing. Moreover, as shown in the embodiment in FIG. 40, the following benefit is produced: treating a built-in action likewise enables a built-in action program to be coexistent with an action program that is loaded dynamically.

According to the present invention, following benefits are produced: it is possible to obtain an access log for specific information data in each of the communication proxy apparatuses 3 in a distributed manner without changing the server device 1 or the client device 2, by instructing an edge communication proxy apparatus 3 on the server device side, which is connected directly to the server device 1 through communication path 4, to keep the access log as an individual action for the specific information data, or by adding an individual action tag, which instructs each communication proxy apparatus 3 to keep the access log, to the information data of the server device 1.

In addition, if the edge communication proxy apparatus 3 on the server device side described above is instructed to collect the access logs for the target information data hierarchically, it is possible to aggregate and collect the access logs for the information data 50, each of which has been kept by each of the communication proxy apparatuses in a distributed manner, by inquiring of only communication proxy apparatuses that have accessed the information data.

Moreover, when updating the information data on the server device 1, if the edge communication proxy apparatus 3 on the server device side, which is directly connected to the server device 1 through communication path 4, is instructed to update a cache hierarchically with reacquisition of the information data 50, it is possible to update the cache 59 of each communication proxy apparatus 3 that holds the cache of the information data 50.

In addition, as an another method for updating the cache of each communication proxy apparatus 3, by instructing the scheduled reacquisition of the information data 50 as an individual action for the specific information data 50, it is possible to update the cache 59 for the information data 50 in each communication proxy apparatus periodically.

In addition, as an individual action for the specific information data, if the edge communication proxy apparatus 3 on the server device side, which is directly connected to the server device 1 through communication path 4, is instructed to perform an access check, having an accessible user, device or group of users/devices information as an action parameter, or if an individual action tag, which instructs to perform the access check having the same action parameter, is attached to the information data of the server device 1, a following benefit is produced: only for the user, the device or the group of users/devices specified, it is possible for each communication proxy apparatus 3 to permit an access to the information data 50, and to return the cache 59 of the information data 50, without changing the server device 1 or the client device 2, and without always transmitting each access check request to the server device 1.

To be more specific, the communication proxy system according to the present invention is characterized in that:

in a network system in which information data held in a server device is accessed from a client device through the communication line, one or more proxy devices are provided between the server device and the client device as the devices for agent-relaying communication between the server device and the client device;

in addition, an edge communication proxy apparatus on the client side or on the server device side, which is directly connected to the client device or the server device through a communication path without passing through other communication proxy apparatuses, is configured by a communication proxy apparatus comprising the above-mentioned individual action tag adding/removing means.

In addition, the communication agent method according to the present invention is characterized in that:

in the above-mentioned communication proxy system, and in the edge communication proxy apparatus on the server device side described above, when information data received by the communication proxy apparatus from the server device and additional data received together with the information data are transmitted to another communication proxy apparatus, if identification information of the information data and individual action definition information for the information data are registered in the action storage means by explicit instruction, an individual action tag indicating action information corresponding to the information data is added to the information data before transmitting the information data; and in the edge communication proxy apparatus on the client device side, when information data received from the server device or from another communication proxy apparatus and additional data received together with the information data are transmitted to the client device, if there is an individual action tag in the additional data, the communication proxy apparatus removes the individual action tag before transmitting the information data and the additional data.

In addition, the communication proxy system and the communication agent method according to the present invention are characterized in that:

in the above-mentioned communication proxy system, each communication proxy apparatus is configured as a communication proxy apparatus comprising both of the individual action control means and the distributed access control means described above;

to begin with, through an individual action instruction means, the edge communication proxy apparatus on the server device side described above, is explicitly instructed beforehand an individual action to be executed for the information data with an identification information of the target information data;

next, the information data is accessed by the client devices for a certain time period;

then, the edge communication proxy apparatus on the server device side is instructed to execute a certain process for the information data using a hierarchical execution means;

and the instructed process is executed hierarchically for a group of communication proxy apparatuses that have actually accessed the information data.

In addition, the communication proxy system and the communication agent method according to the present invention are characterized in that:

as an instruction of hierarchical execution given to the edge communication proxy apparatus on the server device side, an individual action deletion process for deleting individual action definition information of certain information data from the above-mentioned individual action storage means is instructed; and individual action definition information of the information data held in the individual action storage means of each communication proxy apparatus, which has accessed the information data, is deleted.

In addition, the communication proxy system and the communication agent method according to the present invention are characterized in that:

as an instruction of hierarchical execution given to the edge communication proxy apparatus on the server device side, an access log deletion process for deleting an access log of certain information data from the above-mentioned access log storage means is instructed; and an access log of the information data held in the access log storage means of each communication proxy apparatus, which has accessed the information data, is deleted.

As regards an aggregation process for collecting an access log, the access log of the information data held in each communication proxy apparatus, which has accesses the information data, can be aggregated by instructing the hierarchical execution means of the edge communication proxy apparatus on the server device side to aggregate the access log of the target information data. The communication proxy apparatus, which has received a request for the aggregation process, obtains an access log of specified information data held by the communication proxy apparatus, and transfers the aggregation process to the lower level communication proxy apparatuses for which any access log of the information data is logged in the communication proxy apparatus, and executes the aggregating process hierarchically. Results of the aggregation process obtained from the lower level communication proxy apparatuses are aggregated to the access log in own communication proxy apparatus, and the aggregated result is returned as an execution result of the own communication proxy apparatus. Finally, information on all access logs of the target information data can be obtained from the edge communication proxy apparatus on the server device side described above.

More specifically, the communication agent method according to the present invention is characterized in that:

as an individual action for target information data, the individual action instruction means of the communication proxy apparatus on the server device side is instructed beforehand to keep an access log using the access logging means; and after the information data is accessed from the client devices for a certain time period, as a process for instructing the hierarchical execution means of the edge communication proxy apparatus on the server device side, an aggregation process for aggregating the access log of the information data is instructed; and all access logs for the information data are aggregated.

The problem of cache update can be solved by the following: in the first place, as an action, instructing an individual action instruction means of the edge communication proxy apparatus on the server device side to log accesses to the target information data; and instructing a hierarchical execution means of the edge communication proxy apparatus to reacquire the information data immediately after updating the information data by the server device. To be more specific, according to the reacquisition instruction given to this edge communication proxy apparatus, in the first place, the edge communication proxy apparatus requests the server device to reacquire the target information data; a cache of the communication proxy apparatus is updated; using the hierarchical execution function of the hierarchical execution means, the reacquisition request is transferred hierarchically to the communication proxy apparatuses, which have accessed the information data, one after another; and the cache of each communication proxy apparatus is updated to the latest data hierarchically.

More specifically, the communication proxy system and the communication agent method according to the present invention are characterized in that:

the communication proxy apparatus further comprises a caching means for managing the information data, which has been obtained from the server device or from another communication proxy apparatus by the access request agent means, and added data of the information data, as a cache;

the access request agent means of the communication proxy apparatus receives an access request for an access to the information data from the client device or another communication proxy apparatus;

to begin with, the cache, which is kept in the caching means, is checked for the access request;

under a certain condition, a request is not issued to the server device or another communication proxy apparatus, and information held as a cache is used as a reply data for the access request;

under the other conditions, the information data and added data of the information data are obtained as a reply data by requesting the server device or another communication proxy apparatus;

next, an individual action tag included in the reply data is checked using the individual action instruction means, and individual action definition information is registered using the found individual action tag;

in addition, the reply data is held as a cache as necessary using the caching means;

moreover, in the process of the above-mentioned processing, an individual action required for the information data is executed with an appropriate timing using the individual action execution means; and furthermore, the individual action tag is added to, or removed from, the reply data using an individual action tag adding/removing means, and data obtained as a result is returned to a requester.

In addition, the communication agent method according to the present invention is characterized in that:

as an individual action for target information data, the individual action instruction means of the communication proxy apparatus on the server device side is instructed beforehand to keep an access log using the access logging means; and after the information data is accessed from the client devices for a certain time period, as a process for instructing the hierarchical execution means of the edge communication proxy apparatus on the server device side, reacquisition of the information data and attribute information of the information data is instructed; and each communication proxy apparatus, in which an access log for the information data is kept, thereby reacquires the information data and the attribute information of the information data hierarchically to update the cache of each communication proxy apparatus relating to the information data.

In addition, the communication agent method according to the present invention is characterized in that:

each communication proxy apparatus is provided with a reacquisition means for reacquiring information data;

as an individual action for target information data, the communication proxy apparatus on the server device side is instructed through the individual action instruction means to execute the reacquisition means for reacquiring the information data using a schedule;

each communication proxy apparatus, which has accessed the information data, reacquires the information data and the attribute information of the information data automatically according to the schedule to update the cache of the communication proxy apparatus relating to the information data.

In addition, as is the case with the access log, a distributed checking of access authority is realized by instructing action information for executing the access check means when handling an access request, as an individual action using information such as an accessible user, group or device as an action parameter. To be more specific, the check can be performed by giving beforehand the edge communication proxy apparatus on the server device side an explicit instruction including identification information of the target information data and the action information to instruct execution of an individual action for the information data, or by attaching beforehand an individual action tag indicating the action information to the information data on the server device.

More specifically, the communication agent method according to the present invention is characterized in that:

the individual action definition information is provided with action parameter information indicating parameters for the individual action;

in addition, as a processing means to be executed as an the individual action, each communication proxy apparatus is provided with an access check means for permitting an access to the information data, for which access check action is defined, only from a specific user, a specific device, or a specific group of users or devices according to the information specified in the action parameter information; and action information, which specifies the access check means as an individual action to be executed, and the information can access as the action parameter information, is added beforehand as an individual action tag to specific information data which is returned from the server device; or explicit instruction including the action information and identification information of the target information data are given to an individual action instruction means of the edge communication proxy apparatus on the server device side to limit an access to the information data.

In addition, the communication proxy system and the communication agent method according to the present invention are characterized in that:

instead of giving instruction of an individual action for the specific information data to the edge communication proxy apparatus on the server device side beforehand, data having an individual action tag attached to the information data is prepared using a tool for adding the individual action tag to the information data;

the data with the individual action tag attached is held in the server device; and in response to the access request, the server device returns the data with the individual action tag attached as reply data for the access request.

In addition, the communication proxy system according to the present invention are characterized in that:

the individual action instruction means comprises a means for holding an instruction of an action, which should be executed for specific information data, as a form of processing program; and the individual action execution means comprises a means for executing the held processing program as an individual action for the information data.

In addition, the above-mentioned communication proxy apparatus is characterized in that:

the communication proxy apparatus comprises:

a program load means for loading a processing program;

a program storage means for storing the loaded program;

and an action program correlation table that holds a relationship between a program entry address and action identification information;

the program load means comprises:

a means for receiving an instruction including action identification information and program information to be loaded, and for storing the program information in the program storage means; and a means for registering a relationship between an entry address of the stored program information and specified action identification information in the action program correlation table; and the individual action control means uses the information registered in the action program correlation table to execute the corresponding individual action program.

In addition, the communication proxy system and the communication agent method according to the present invention are characterized in that:

as regards an action to be executed as an individual action, a processing program and action identification information are instructed to the program load means of the communication proxy apparatus;

the action processing program is loaded beforehand while the action processing program is associated with the instructed action identification information; and an instruction of the action identification information is given to the individual action instruction means to execute the individual action for the target information data.

As described above, according to the present invention, in response to an access request for an access to information data from the client devices, it is possible to provide a communication proxy apparatus, a communication proxy system, and a communication agent method, which are suitable for realizing an access to latest information data at high speed by making full use of a cache without changing the server device or the client device, and for realizing high-speed access control by an easy instruction.

What is claimed is:

1. A communication proxy apparatus comprising:

an access request agent, wherein said access request agent is placed on a communication path between a server device and a client device; receives an access request for an access to information data held in the server device from the client device or another at least one communication proxy apparatus; issues the access request, as an agent, to the server device or still another at least one communication proxy apparatus; obtains the requested information data and attribute information of the information data; and returns the obtained data; and an individual action control agent comprising:

an individual action storage for storing individual action definition information indicating a relationship between the information data and action information that indicates an action to be executed for the specific information data processed by the communication proxy apparatus as an agent, and that indicates execution conditions of the action;

an individual action instruction agent for registering individual action definition information in the individual action storage; and wherein an individual action execution agent for executing an individual action for the information data, which is the data obtained from the server device, based on the individual action definition information, under instructed conditions;

wherein said individual action instruction agent comprises means for registering individual action definition information of the information data in individual action instruction storage according to the action information, if registration in the individual action storage is instructed by an explicit instruction containing identification information of target information data and action information to be executed for the information data, or if as a result of checking information data received by the communication proxy apparatus, it is found that an individual action tag for instructing action information to be executed for the information data is added to the information data;

wherein an individual action tag control agent comprises an individual action tag adding/removing agent for adding the individual action tag or removing the added individual action tag, under a certain condition, when transmitting from the communication proxy apparatus the information data received by the communication proxy apparatus, and the added data received together with the information data;

wherein said individual action definition information comprises an action type classification information for specifying that the individual action definition information is registered according to identification information of target information data and explicit instruction of action information, or that the individual action definition information is registered by an individual action tag added to the information data;

the individual action instruction agent comprises means for registering the action type classification information when individual action definition information of each information data is registered in the individual action storage means; and wherein the individual action tag adding/removing agent comprises means for adding an individual action tag corresponding to the information data before transmitting the information data, when for the information data transmitted from the communication proxy apparatus, the identification information of the information data and individual action definition information explicitly specified by action information is stored in the individual action storage means.

2. A communication proxy apparatus comprising:

an access request agent, wherein said access request agent is placed on a communication path between a server device and a client device; receives an access request for an access to information data held in the server device from the client device or another at least one communication proxy apparatus; issues the access request, as an agent, to the server device or still another at least one communication proxy apparatus; obtains the requested information data and attribute information of the information data: and returns the obtained data; and an individual action control agent comprising: an individual action storage for storing individual action definition information indicating a relationship between the information data and action information that indicates an action to be executed for the specific information data processed by the communication proxy apparatus as an agent, and that indicates execution conditions of the action;

an individual action instruction agent for registering individual action definition information in the individual action storage; and an individual action execution agent for executing an individual action for the information data, which is the data obtained from the server device, based on the individual action definition information, under instructed conditions, wherein said individual action instruction agent comprises a means by which, if registration in the individual action storage means is instructed by an explicit instruction containing identification information of target information data and action information to be executed for the information data, or if as a result of checking information data received by the communication proxy apparatus, it is found that an individual action tag for instruction action information to be executed for the information data is added to the information data, individual action definition information of the information data is registered in the individual action instruction storage according to the action information;

wherein an individual action tag control agent comprises an individual action tag adding/removing agent for adding the individual action tag or removing the added individual action tag or removing the added individual action tag, under a certain condition, when transmitting from the communication proxy apparatus the information data received by the communication proxy apparatus, and the added data received together with the information data;

wherein the individual action instruction agent comprises a means for storing an action instruction, which should be executed for said individual action tag, as a form of processing program; and wherein the individual action execution agent comprises a means for executing the held processing program as an individual action for said individual action tag.

3. A communication proxy apparatus according to claim 2, wherein:

said communication apparatus comprises:

a program load means for loading a processing program in the communication proxy apparatus;

a program storage means for storing a loaded program;

and an action program correlation table that hold a relationship between a program entry address and action identification information;

said program load means comprises:

a means for receiving an instruction including action identification information and program information to be loaded, and for storing the program information in the program storage means; and a means for registering a relationship between an entry address of the stored program information and specified action identification information in the action program correlation table; and wherein the individual action control agent uses the information registered in the action program correlation table to execute the corresponding individual action program.

* * * * *